(12) United States Patent
Weston et al.

(10) Patent No.: US 9,329,030 B2
(45) Date of Patent: May 3, 2016

(54) NON-CONTACT OBJECT INSPECTION

(75) Inventors: Nicholas John Weston, Peebles (GB); Yvonne Ruth Huddart, Edinburgh (GB)

(73) Assignee: RENISHAW PLC, Wotton-Under-Edge (GB)

( * ) Notice: Subject to any disclaimer, the term of this patent is extended or adjusted under 35 U.S.C. 154(b) by 900 days.

(21) Appl. No.: 13/392,710

(22) PCT Filed: Sep. 6, 2010

(86) PCT No.: PCT/GB2010/001675
§ 371 (c)(1),
(2), (4) Date: Feb. 27, 2012

(87) PCT Pub. No.: WO2011/030090
PCT Pub. Date: Mar. 17, 2011

(65) Prior Publication Data
US 2012/0154576 A1    Jun. 21, 2012

(30) Foreign Application Priority Data

Sep. 11, 2009 (GB) .................................. 0915904.7

(51) Int. Cl.
  G06K 9/00     (2006.01)
  G01B 11/25    (2006.01)
  G01B 11/00    (2006.01)
(52) U.S. Cl.
  CPC .............. *G01B 11/25* (2013.01); *G01B 11/007* (2013.01)
(58) Field of Classification Search
  None
  See application file for complete search history.

(56) References Cited

U.S. PATENT DOCUMENTS

| | | | |
|---|---|---|---|
| 4,767,212 A | 8/1988 | Kitahashi et al. |
| 5,135,309 A | 8/1992 | Kuchel et al. |
| 5,175,601 A | 12/1992 | Fitts |
| 5,237,404 A | 8/1993 | Tanaka et al. |
| 5,251,156 A | 10/1993 | Heier et al. |

(Continued)

FOREIGN PATENT DOCUMENTS

| CN | 1952595 A | 4/2007 |
|---|---|---|
| CN | 101105393 A | 1/2008 |

(Continued)

OTHER PUBLICATIONS

Michal Pawlowski et al., "Shape and Position Determination Based on Combination of Photogrammetry with Phase Analysis of Fringe Patterns," CAIP 2001, LNCS 2124, pp. 391-399.

(Continued)

*Primary Examiner* — Aaron W Carter
(74) *Attorney, Agent, or Firm* — Oliff PLC

(57) ABSTRACT

A non-contact method of inspecting the topography of an area of an object via analysis of the phase of a pattern projected on the object. The method includes taking a first image of the object, obtained from a first perspective, on which an optical pattern is projected, and taking a second image of the object, obtained from a second perspective, on which an optical pattern is projected but in which the optical pattern, as it falls on the object, in the second image differs to that in the first image. The method further includes determining data describing the topography of at least a region of the object based on phase data relating to the phase of at least a region of the optical pattern as imaged in the first image. Phase data obtained from a corresponding region of the object as imaged in the second image is used to resolve any ambiguity in the phase or topography data obtained from the first image.

29 Claims, 12 Drawing Sheets

(56) References Cited

U.S. PATENT DOCUMENTS

| | | | | |
|---|---|---|---|---|
| 5,262,844 | A * | 11/1993 | Millet et al. | 356/604 |
| 5,289,264 | A | 2/1994 | Steinbichler | |
| 5,319,445 | A | 6/1994 | Fitts | |
| 5,372,502 | A | 12/1994 | Massen et al. | |
| 5,488,477 | A | 1/1996 | De Groot | |
| 5,646,733 | A | 7/1997 | Bieman | |
| 5,953,448 | A * | 9/1999 | Liang | 382/154 |
| 6,028,672 | A | 2/2000 | Geng | |
| 6,055,056 | A | 4/2000 | Kuehmstedt et al. | |
| 6,084,712 | A * | 7/2000 | Harding | 359/618 |
| 6,100,984 | A | 8/2000 | Chen et al. | |
| 6,144,453 | A | 11/2000 | Hallerman et al. | |
| 6,256,099 | B1 | 7/2001 | Kaufman et al. | |
| 6,291,817 | B1 | 9/2001 | Kobayashi et al. | |
| 6,421,629 | B1 | 7/2002 | Ishiyama | |
| 6,438,272 | B1 * | 8/2002 | Huang et al. | 382/286 |
| 6,532,299 | B1 * | 3/2003 | Sachdeva et al. | 382/128 |
| 6,600,511 | B1 | 7/2003 | Kaneko et al. | |
| 6,674,893 | B1 | 1/2004 | Abe et al. | |
| 6,728,423 | B1 * | 4/2004 | Rubbert et al. | 382/294 |
| 6,738,508 | B1 * | 5/2004 | Rubbert et al. | 382/154 |
| 6,744,914 | B1 * | 6/2004 | Rubbert et al. | 382/154 |
| 6,744,932 | B1 * | 6/2004 | Rubbert et al. | 382/294 |
| 6,771,809 | B1 * | 8/2004 | Rubbert et al. | 382/154 |
| 7,001,024 | B2 | 2/2006 | Kitaguchi et al. | |
| 7,068,836 | B1 * | 6/2006 | Rubbert et al. | 382/154 |
| 7,103,211 | B1 | 9/2006 | Medioni et al. | |
| 7,133,551 | B2 | 11/2006 | Chen et al. | |
| 7,136,170 | B2 | 11/2006 | Notni et al. | |
| 7,171,328 | B1 | 1/2007 | Walker et al. | |
| 7,256,899 | B1 | 8/2007 | Faul et al. | |
| 7,310,514 | B2 | 12/2007 | Shinohara | |
| 7,315,643 | B2 | 1/2008 | Sakamoto et al. | |
| 7,394,536 | B2 | 7/2008 | Sonda et al. | |
| 7,430,312 | B2 * | 9/2008 | Gu | 382/154 |
| 7,538,891 | B1 | 5/2009 | Mello et al. | |
| 7,545,516 | B2 | 6/2009 | Jia et al. | |
| 7,684,052 | B2 | 3/2010 | Suwa et al. | |
| 7,898,651 | B2 | 3/2011 | Hu et al. | |
| 7,912,673 | B2 | 3/2011 | Hebert et al. | |
| 7,929,751 | B2 * | 4/2011 | Zhang et al. | 382/154 |
| 8,111,907 | B2 | 2/2012 | Boyer et al. | |
| 2002/0057832 | A1 * | 5/2002 | Proesmans et al. | 382/154 |
| 2002/0181764 | A1 | 12/2002 | Otani et al. | |
| 2003/0123707 | A1 | 7/2003 | Park | |
| 2003/0174880 | A1 | 9/2003 | Sakamoto et al. | |
| 2004/0246496 | A1 | 12/2004 | Yoshida | |
| 2005/0018209 | A1 | 1/2005 | Lemelin et al. | |
| 2005/0201611 | A1 | 9/2005 | Lloyd et al. | |
| 2005/0271264 | A1 | 12/2005 | Ito et al. | |
| 2006/0093206 | A1 * | 5/2006 | Rubbert et al. | 382/154 |
| 2006/0103854 | A1 | 5/2006 | Franke et al. | |
| 2006/0210146 | A1 * | 9/2006 | Gu | 382/154 |
| 2006/0268153 | A1 | 11/2006 | Rice et al. | |
| 2007/0057946 | A1 | 3/2007 | Albeck et al. | |
| 2007/0183631 | A1 | 8/2007 | Zhang et al. | |
| 2007/0206204 | A1 | 9/2007 | Jia et al. | |
| 2007/0211258 | A1 * | 9/2007 | Lee et al. | 356/605 |
| 2008/0075328 | A1 | 3/2008 | Sciammarella | |
| 2008/0165341 | A1 * | 7/2008 | Dillon et al. | 356/2 |
| 2008/0239288 | A1 * | 10/2008 | Lee et al. | 356/73 |
| 2009/0238449 | A1 * | 9/2009 | Zhang et al. | 382/165 |
| 2009/0268214 | A1 | 10/2009 | Lucic et al. | |
| 2010/0008588 | A1 * | 1/2010 | Feldkhun et al. | 382/206 |
| 2010/0046005 | A1 | 2/2010 | Kalkowski et al. | |
| 2010/0135534 | A1 * | 6/2010 | Weston et al. | 382/106 |
| 2010/0296104 | A1 * | 11/2010 | Abramovich et al. | 356/601 |
| 2010/0329538 | A1 * | 12/2010 | Remillard | 382/141 |
| 2011/0317879 | A1 | 12/2011 | Demopoulos | |
| 2012/0307260 | A1 | 12/2012 | Keshavmurthy et al. | |

FOREIGN PATENT DOCUMENTS

| | | |
|---|---|---|
| DE | 38 29 925 A1 | 3/1990 |
| DE | 39 38 714 A1 | 5/1991 |
| DE | 43 01 538 A1 | 7/1994 |
| DE | 196 34 254 A1 | 3/1997 |
| DE | 198 46 145 A1 | 4/2000 |
| EP | 0 445 618 A2 | 9/1991 |
| EP | 0 402 440 B1 | 6/1995 |
| GB | 2 088 095 A | 6/1982 |
| GB | 2 375 392 B | 12/2004 |
| GB | 2 434 541 A1 | 8/2007 |
| JP | A-61-114109 | 5/1986 |
| JP | H04-204314 A | 7/1992 |
| JP | A-6-138055 | 5/1994 |
| JP | A-07-260451 | 10/1995 |
| JP | A-11-211442 | 8/1999 |
| JP | A-11-211443 | 8/1999 |
| JP | A-2000-097672 | 4/2000 |
| JP | A-2001-012925 | 1/2001 |
| JP | A-2001-108422 | 4/2001 |
| JP | A-2002-54912 | 2/2002 |
| JP | A-2002-90126 | 3/2002 |
| JP | A-2002-162215 | 6/2002 |
| JP | A-2003-269928 | 9/2003 |
| JP | A-2003-527582 | 9/2003 |
| JP | A-2004-317495 | 11/2004 |
| JP | A-2005-345383 | 12/2005 |
| JP | A-2006-179031 | 7/2006 |
| JP | A-2007-024764 | 2/2007 |
| JP | A-2007-093412 | 4/2007 |
| JP | A-2007-121294 | 5/2007 |
| JP | A-2007-315882 | 12/2007 |
| JP | A-2008-76107 | 4/2008 |
| WO | WO 91/15732 | 10/1991 |
| WO | WO 97/05449 A1 | 2/1997 |
| WO | WO 97/36144 | 10/1997 |
| WO | WO 00/21034 A1 | 4/2000 |
| WO | WO 01/51887 A1 | 7/2001 |
| WO | WO 2004/083778 A1 | 9/2004 |
| WO | WO 2004/096502 A1 | 11/2004 |
| WO | WO 2005/059470 A1 | 6/2005 |
| WO | WO 2005/073669 A1 | 8/2005 |
| WO | WO 2007/121953 A1 | 11/2007 |
| WO | WO 2007/125081 A1 | 11/2007 |
| WO | WO 2008/046663 A2 | 4/2008 |
| WO | WO 2009/024756 A1 | 2/2009 |
| WO | WO 2009/024757 A1 | 2/2009 |
| WO | WO 2009/024758 A1 | 2/2009 |
| WO | WO 2009024756 A1 * | 2/2009 |
| WO | WO 2009/094510 A1 | 7/2009 |
| WO | WO 2009/097066 A1 | 8/2009 |

OTHER PUBLICATIONS

Jul. 24, 2014 Office Action issued in Application No. 08 788 329.4.
Jul. 25, 2013 Office Action issued in U.S. Appl. No. 12/733,022.
Wolfson, Wendy and Gordon, Stephen J., "Three-Dimensional Vision Technology Offers Real-Time Inspection Capability," Sensor Review, 1997, pp. 299-303, vol. 17, No. 4. MCB University Press.
Oct. 20, 2014 Notice of Allowance issued in U.S. Appl. No. 12/733,025.
Dec. 2, 2013 Chinese Office Action issued in Chinese Patent Application No. 201080040329.0 (with English-language translation).
Apr. 26, 2012 Office Action issued in European Patent Application No. 08 788 328.6.
May 3, 2012 Chinese Office Action issued in Chinese Patent Application No. 200880112194.7 (with translation).
Apr. 23, 2012 Chinese Office Action issued in Chinese Patent Application No. 200880111248.8 (with translation).
May 3, 2012 Office Action issued in Chinese Patent Application No. 200880111247.3 (with translation).
Aug. 21, 2012 Office Action issued in U.S. Appl. No. 12/733,025.
Aug. 23, 2012 Office Action issued in U.S. Appl. No. 12/733,022.
Kemper et al., "Quantitative determination of out-of-plane displacements by endoscopic electronic-speckle-pattern interferometry" Optics Communication 194 (2001), pp. 75-82, Jul. 1, 2001.

(56) References Cited

OTHER PUBLICATIONS

Cuypers, W., et al., "Optical measurement techniques for mobile and large-scale dimensional metrology," *Optics and Lasers in Engineering*, 47, (2009), pp. 292-300.
"Picture Perfect Measurements, Do I need to use special targets with the system?," 1 page, Geodetic Systems Inc., downloaded Sep. 6, 2012 from http://www.geodetic.com/do-i-need-to-use-special-targets-with-the-system.aspx.
"Application Notes—TRITOP," 1 page, GOM Optical Measuring Techniques, downloaded Sep. 6, 2012 from http://www.gom.com/industries/application-notes-tritop.html.
"Picture Perfect Measurements, The Basics of Photogrammetry," 14 pages, Geodetic Systems Inc., downloaded Sep. 6, 2012 from http://www.geodetic.com/v-stars/what-is-photogrammetry.aspx.
"Application Example: 3D-Coordinate Measurement Mobile 3D Coordinate Measurement for Shipbuilding," 6 pages, GOM Optical Measuring Techniques, downloaded Sep. 6, 2012 from http://www.gom.com/fileadmin/user_upload/industries/shipbuilding_EN.pdf.
Wallace, Iain et al., "High-speed photogrammetry system for measuring the kinematics of insect wings," *Applied Optics*, vol. 45, No. 17, Jun. 10, 2006, pp. 4165-4173.
Sep. 19, 2012 Office Action issued in U.S. Appl. No. 12/733,021.
Reeves et al., "Dynamic shape measurement system for laser materials processing," Optical Engineering 42 (10), pp. 2923-2929 (2003).
Huntley et al., "Shape measurement by temporal phase unwrapping: comparison of unwrapping algorithms," Measurement Science and Technology 8, pp. 986-992 (1997).
Brauer-Burchardt et al., "Phase unwrapping in fringe projection systems using epipolar geometry," LNCS 5259, pp. 422-432 (2008).
Ishiyama et al., "Absolute phase measurements using geometric constraints between multiple cameras and projectors," Applied Optics 46 (17), pp. 3528-3538 (2007).
Sasso et al., "Superimposed fringe projection for three-dimensional shape acquisition by image analysis," Applied Optics 48 (13), pp. 2410-2420 (2009).
Patil et al., "Guest editorial. Moving ahead with phase," Optics and Lasers in Engineering 45, pp. 253-257 (2007).
Takeda et al., "Fourier transform profilometry for the automatic measurement of 3-D object shapes," Applied Optics 22 (24), pp. 3977-3982 (1983).
Kowarschik et al., "Adaptive optical three-dimensional measurement with structured light," Optical Engineering 39 (1), pp. 150-158 (2000).
Jul. 22, 2014 Office Action issued in Japanese Patent Application No. 2010-521465 with an English translation.
Aug. 16, 2013 Office Action issued in Japanese Patent Application No. 2010-521465 w/translation.
Aug. 9, 2013 Office Action issued in Japanese Patent Application No. 2010-521466 w/translation.
Aug. 9, 2013 Office Action issued in Japanese Patent Application No. 2010-521467 w/translation.
Sep. 11, 2013 Office Action issued in U.S. Appl. No. 12/733,025.
Mar. 12, 2013 Office Action issued in U.S. Appl. No. 12/733,022.
May 28, 2014 Notice of Allowance issued in U.S. Appl. No. 12/733,025.
Aug. 12, 2014 Office Action issued in Japanese Patent Application No. 2012-5288441 (with English-language translation).
Feb. 16, 2013 Office Action issued in Chinese Patent Application No. 200880112194.7 (with English-language translation).
Sep. 21, 2012 Office Action issued in Japanese Patent Application No. 2010-521465 (with English Translation).
Nov. 16, 2012 Office Action issued in Japanese Patent Application No. 2010-521466 (with English Translation).
Feb. 7, 2013 Office Action issued in U.S. Appl. No. 12/733,021.
Feb. 6, 2013 Office Action issued in U.S. Appl. No. 12/733,025.
Translation of JP-A-2007-24764 originally cited in an Information Disclosure Statement filed on Nov. 20, 2012.
Feb. 28, 2014 Notice of Allowance issued in U.S. Appl. No. 12/733,025.
Jan. 31, 2014 Notice of Allowance issued in U.S. Appl. No. 12/733,022.
Nov. 16, 2012 Office Action issued in Japanese Patent Application No. 2010-521467 (with English translation).
Feb. 25, 2014 Office Action issued in Japanese Patent Application No. 2010-521467 (with English translation).
Notice of Allowance issued in U.S. Appl. No. 12/733,021 dated Sep. 3, 2013.
Translation of CN 101105393, previously submitted on Jan. 30, 2014.
Feb. 16, 2013 Office Action issued in Chinese Application No. 200880111247.3 (with English translation).
Feb. 16, 2013 Office Action issued in Chinese Application No. 200880112194.7 (with English translation).
English-language translation of JP-A-2007-93412 published Apr. 12, 2007.
English-language translation of JP-A-11-211442 published Aug. 6, 1999.
Japanese Office Action issued in Japanese Patent Application No. 2012-528441 dated Jan. 28, 2014 (w/ translation).
European Office Action issued in European Patent Application No. 08 788 328.6 dated Feb. 27, 2014.
Marapane, "Region-Based Stereo Analysis for Robotic Applications", IEEE, 1989, pp. 307-324.
Takasaki, "Moire Topography", Applied Optics, Jun. 1970, vol. 9, No. 6, pp. 1467-1472.
Takeda et al, "Fourier-transform method of fringe-pattern analysis for computer-based topography and interferometry", Optical Society of America, Jan. 1982, vol. 72, No. 1, pp. 156-160.
Geometrical Product Specifications (GPS)—Geometrical Features, British Standard, BS EN ISO 1466-1:2000.
Heikkilä et al., "A Four-step Camera Calibration Procedure with Implicit Image Correction," 1997, Proceedings of the 1997 Conference in Computer Vision and Pattern Recognition.
Fryer, "Camera Calibration," Close Range Photogrammetry and Machine Vision, 1996, pp. 156-179, Whittles Publishing.
Creath, "Comparison of Phase-Measurement Algorithms," Surface Characterization and Testing, 1986, pp. 19-28, SPIE, vol. 680.
Carré, "Installation et utilisation du comparateur photoélectrique et interférential du Bureau International des Poids et Mesures," 1966, Metrologia, pp. 13-23, vol. 2, No. 1, France (with abstract).
Stoilov et al., "Phase-stepping Interferometry: Five-frame Algorithm with an Arbitrary Step," Optics and Lasers in Engineering, 1997, pp. 61-69, vol. 28.
Parker, "Advanced-Edge Detection Techniques: The Canny and the Shen-Castan Methods," 1997, pp. 1-33, John Wiley & Sons, Inc.
Gruen, "Least squares matching: a fundamental measurement algorithm," Close Range Photogrammetry and Machine Vision, 2001, pp. 217-255, Whittles Publishing.
Cooper et al., "Theory of close range photogrammetry," Close Range Photogrammetry and Machine Vision, 2001, pp. 9-51, Whittles Publishing.
Korner et al., Absolute macroscopic 3-D measurements with the innovative depth-scanning fringe projection technique (DSFP), Optik International Journal for Light and Electron Optics, 2001, pp. 433-441, vol. 112, No. 9.
Scharstein et al., "High-Accuracy Stereo Depth Maps Using Structured Light," Proc. 2003 IEEE Computer Society Conference on Computer Vision and Pattern Recognition, 2003, pp. 195-202, vol. 1, Computer Society.
Reich et al., "3-D shape measurement of complex objects by combining photogrammetry and fringe projection," Optical Engineering, 2000, pp. 224-231, vol. 39, No. 1, Society of Photo-Optical Instrumentation Engineers.
Ishiyama et al., "Precise 3-D Measurement Using Uncalibrated Pattern Projection," IEEE International Conference on Image Processing, 2007, pp. 225-228.
Kühmstedt et al., "3D shape measurement with phase correlation based fringe projection," Optical Measurement Systems for Industrial Inspection V, 2007, pp. 1-9, vol. 6616, Proc. of SPIE.
Schreiber et al., "Managing some calibration problems in fringe projection shape measurement systems," Measurement Systems for Optical Methodology, 1997, pp. 443-450, Fringe.

(56) References Cited

OTHER PUBLICATIONS

Schreiber et al., "Theory and arrangements of self-calibrating whole-body three-dimensional measurement systems using fringe projection technique," Optical Engineering, 2000, pp. 159-169, vol. 39, No. 1, Society of Photo-Optical Instrumentation Engineers.
Chen et al., "Range data acquisition using color structured lighting and stereo vision," Image and Vision Computing, 1997, pp. 445-456, vol. 15, Elsevier.
Kim et al., "An active trinocular vision system of sensing indoor navigation environment for mobile robots," Sensors and Actuators A, Sep. 2005, pp. 192-209, vol. 125, Elsevier.
Wong et al., "Fast acquisition of dense depth data by a new structured light scheme," Computer Vision and Image Understanding, Dec. 2004, pp. 398-422, vol. 98, Elsevier.
"3D Coordinate Measurement—Milling on digitized data; Casted Blanks," www.gom.com, obtained Aug. 7, 2007, GOM mbH.
"Measuring Systems—TRITOP," http://www.gom.com/EN/measuring.systems/tritop/system/system.html, obtained Aug. 7, 2007, GOM mbH.
Clarke, "Non-contact measurement provides six of the best," Quality Today, 1998, pp. s46, s48.
Coggrave, "Wholefield Optical Metrology: Surface Profile Measurement," 2002-2004, pp. 1-35, Phase Vision Ltd.
Chen et al., "Overview of three-dimensional shape measurement using optical methods," Opt. Eng., 2000, pp. 10-22, Society of Photo-Optical Instrumentation Engineers.
Sansoni et al., "Three-dimensional vision based on a combination of gray-code and phase-shift light projection: analysis and compensation of the systematic errors," Applied Optics, 1999, pp. 6565-6573, vol. 38, No. 31, Optical Society of America.
Leymarie, "Theory of Close Range Photogrammetry," http://www.lems.brown.edu/vision/people/leymarie/Refs/Photogrammetry/Atkinson90/Ch2Theory.html, May 10, 2010 update, Ch. 2 of [Atkinson 90], obtained Mar. 31, 2010.
"Measuring Systems—ATOS," http://www.gom.com/EN/measuring.systems/atos/system/system.html, obtained Oct. 6, 2008, GOM mbH.
"3D-Digitizing of a Ford Focus—Interior/Exterior—Product Analysis," www.gom.com, obtained Oct. 6, 2008, GOM mbH.
"optoTOP-HE—The HighEnd 3D Digitising System," http://www.breuckmann.com/index.php?id=optotop-he&L=2, obtained Oct. 6, 2008, Breuckmann.
Galanulis et al., "Optical Digitizing by ATOS for Press Parts and Tools," www.gom.com, Feb. 2004, GOM mbH.
Hailong, et al., "Shape reconstruction methods from gradient field", Laser Journal, 2007, vol. 28, No. 6, pp. 41-43 (with Abstract).
Tsai et al., "A New Technique for Fully Autonomous and Efficient 3D Robotics Hand/Eye Calibration", IEEE Transactions on Robotics and Automation, Jun. 1989, vol. 5, No. 3, p. 345-358.
Jan. 30, 2012 Office Action issued in European Application No. 08 788 327.8.
Jan. 30, 2012 Office Action issued in European Application No. 08 788 329.4.
Jan. 6, 2012 Second Office Action issued in Chinese Patent Application No. 200880111248.8 (translation only).
Jun. 15, 2011 Office Action issued in Chinese Patent Application No. 200880111247.3 (translation only).
Mar. 9, 2011 Office Action issued in Chinese Patent Application No. 200880111248.8 (translation only).
Jun. 15, 2011 Office Action issued in Chinese Patent Application No. 200880112194.7 (translation only).
Sep. 29, 2009 Search Report issued in Great Britain Application No. GB0915904.7.
Dec. 21, 2010 International Search Report issued in International Application No. PCT/GB2010/0001675.
Dec. 21, 2010 Written Opinion of the International Searching Authority issued in International Application No. PCT/GB2010/0001675.
Nov. 18, 2008 International Search Report issued in International Patent Application No. PCT/GB2008/002759.
Nov. 18, 2008 Written Opinion issued in International Patent Application No. PCT/GB2008/002759.
Nov. 18, 2008 International Search Report issued in International Patent Application No. PCT/GB2008/002760.
Nov. 18, 2008 Written Opinion issued in International Patent Application No. PCT/GB2008/002760.
Nov. 18, 2008 International Search Report issued in International Patent Application No. PCT/GB2008/002758.
Nov. 18, 2008 Written Opinion issued in International Patent Application No. PCT/GB2008/002758.
U.S. Appl. No. 12/733,022, filed Feb. 3, 2010 in the name of Weston et al., Specification, Claims and Drawings Only.
U.S. Appl. No. 12/733,021, filed Feb. 3, 2010 in the name of Weston et al., Specification, Claims and Drawings Only.
U.S. Appl. No. 12/733,025, filed Feb. 3, 2010 in the name of Weston et al., Specification, Claims and Drawings Only.
Human Translation of DE 196 34 254 A1, Orginally published on Mar. 6, 1997 in Germany.
Mar. 3, 2015 Notice for Revocation of Reconsideration issued in Japanese Application No. 2010-521465.
Oct. 28, 2015 Office Action issued in U.S. Appl. No. 14/562,093.
Jul. 6, 2015 Office Action issued in European Application No. 10 761 058.6.

\* cited by examiner

NON-CONTACT OBJECT INSPECTION

This invention relates to a method and apparatus for non-contact object inspection, and in particular to methods and apparatus for inspection of an object via analysis of a pattern projected on the surface of the object.

Non-contact optical measuring systems are known for measuring the topography of a surface via phase analysis of an optical pattern on an object. Non-contact optical measuring systems typically comprise a projector which projects a structured light pattern onto an object and a camera which records, e.g. images, the structured light pattern on the object. The object causes a distortion in the pattern and topographical data regarding the object can be calculated from this distortion as imaged by the camera. A particular example of such a system is described in International Patent Application no. PCT/GB2008/002759 (publication no. WO 2009/024757).

With such systems it can be difficult to determine which part of the projected pattern is falling on which part of the object (this is especially the case with repetitive patterns) and as a result it can be difficult to determine the absolute position of the object, i.e. the distance between object and camera. This problem is commonly known in the field of structured light analysis as the $2\pi$ ambiguity problem.

A known way of overcoming this problem includes projecting a marker feature to identify a unique point in the pattern. The system can be calibrated such that the distance between the point of the object on which the marker feature falls and the camera can be determined from the position of the marker feature on the camera's sensor. This can then be used as a reference point to determine the absolute dimensions of the rest of the face on which the marker feature falls. However, with complex objects, the marker feature may not fall on the face of interest and/or there could be a plurality of faces of different unknown relative heights.

Other known solutions include projecting a sequence of different patterns, a pattern with known pseudo-random variations allowing the unique identification of various points, or (as described in WO 2009/024757) using photogrammetric techniques to establish the absolute position of at least one point on the object. However, depending on the object and/or view point, it may not be possible to identify a suitable point for photogrammetric measurement. For example, with an extended smooth surface the boundaries may not be visible from more than one perspective.

The present invention provides a method for inspecting an object, comprising taking an image of the object on which an optical pattern is projected and determining data describing the topography of the object from the image, in which any $2\pi$ ambiguity is resolved using a second image of the object taken from a second perspective on which the optical pattern as it falls on the object differs to that of the first image.

According to a first aspect of the invention there is provided a non-contact method of inspecting the topography of an area of an object via analysis of the phase of a pattern projected on the object, comprising: i) taking a first image of the object, obtained from a first perspective, on which an optical pattern is projected; ii) taking a second image of the object, obtained from a second perspective, on which an optical pattern is projected but in which the optical pattern, as it falls on the object, in the second image differs to that in the first image; and iii) determining data describing the topography of at least a region of the object based on phase data relating to the phase of at least a region of the optical pattern as imaged in the first image in which phase data obtained from a corresponding region of the object as imaged in the second image is used to resolve any ambiguity in the phase or topography data obtained from the first image.

Accordingly, the present invention enables object topography data to be obtained by analysing images of the object obtained from different perspectives, in which an optical pattern is projected on the object in the images. Any $2\pi$ ambiguity is resolved for the entire region using the second image obtained from a different perspective.

As described in WO 2009/024757, photogrammetric methods are used to identify the absolute height of one or more discrete feature points connected to the region and then this absolute height data is used in the generation of regional topography data. In contrast, in the method of the present invention absolute topographical (height) data is generated for an entire region in a single process, i.e. without requiring discrete feature points to be identified and measured separately.

Data derived from the first image for the region can be compared to data derived from the second image for at least one region to identify correlating, e.g. matching, regional data so as to resolve any ambiguity. In particular, the method can comprise iteratively comparing data, in particular regional data, derived from the first and second images to resolve any ambiguity by deduction. Accordingly, the correct topography data can be deduced via an iterative comparison process. The data compared can relate directly or indirectly to the phase data obtained from the images, in particular unwrapped phase data as described in more detail below. Optionally, the data compared can comprise topography data derived from the phase data.

Accordingly, the method involves using regions of data from the images, e.g. regions of phase data, to resolve any $2\pi$ ambiguity. As will be understood, a region of data is to be distinguished from point data. For instance, any such region can comprise an area extending substantially in two dimensions on the image sensor. For example this may comprise a set of mutually adjacent pixels at least of the order of 10 pixels in at least one of height and width, preferably at least of the order of 100 pixels in at least one of height and width. This might be at least 1% of the height or width of the image. Accordingly, the 2D area can be at least 0.01% of the total area of the image. Optionally, the 2D area can be at least 0.1%, preferably at least 1% of the total area of the image. As will be understood, the 2D area can be much greater than 1%, for instance, at least 10% and even any value up to the whole of the total image area.

The optical pattern as it falls on the object can differ in the second image with respect to the first image as a result of a different optical pattern being projected. That is, the optical pattern projected onto the object in the first and second images can be different.

Accordingly, a suitable projector of the optical pattern could be configured such that the optical pattern projected by the projector can be changed. Not only can this be helpful in order to change the optical pattern as it falls on the object in the second image, but this can be helpful when obtaining a plurality of images obtained from a given perspective, in which the phase of the optical pattern at the surface is changed between a plurality of images, as explained in more detail below. For instance, such projectors can include a digital light projector configured to project an image input from a processor device and projectors comprising moveable diffraction grating(s).

Optionally, the optical pattern as it falls on the object can differ by virtue of at least one of the relative position and orientation of the projector of the optical pattern and object being different for the first and second images. In this case, the optical pattern projected can be same for both the first and second images, but they are projected from a different position and/or orientation. (Although, as will be understood, the optical pattern projected onto the object could be different for the first and second images even if they are projected from different a position and/or orientation). The difference in position and/or orientation of the projector and object for the first and second images could be achieved by using a plurality of projectors having different positions and/or orientations.

The projector of the optical pattern imaged in the first image and the projector of the optical pattern imaged in the second image can be provided by a common optical pattern projector unit comprising at least one projector. The method can comprise relatively moving the object and the optical pattern projector unit between the first and second images. In particular, the method can comprise moving the optical pattern projector unit relative to the object. The optical pattern projected onto the object in the first and second images could be projected by the same projector. Accordingly, the optical pattern projector unit could comprise a single projector.

Accordingly, at least one of the relative position and relative orientation of the object and projector of the optical pattern at the point the first image is obtained can be different to that of the object and projector of the optical pattern at the point the second image is obtained. This will be the case for instance when the first and second images are obtained by the same imager device which is in a fixed spatial relationship with the optical pattern projector (as described in more detail below).

It can be preferred that the projector for use with the invention has a single fixed optical pattern. This can often simplify the design of the projector, leading it to be cheaper, lighter and/or more compact than one which facilitates the changing of the optical pattern. For instance, the projector could comprise fixed diffraction gratings, or two fixed mutually coherent light sources, such that the optical pattern projected by the projector cannot be changed. In embodiments in which a plurality of images need be obtained from a given perspective in which the phase of the optical pattern at the surface is changed between the plurality of (for example first) images, then this can be achieved by relatively shifting the object and projector between each of the plurality of (first) images. Further details of such methods are described in more detail in International Patent Application no. PCT/GB2008/002759 (publication no. WO2009/024757), the content of which is incorporated into this specification by this reference.

The at least first and second images can be obtained by at least one suitable imager device. Suitable imager devices can comprise at least one image sensor. For example, suitable imager devices can comprise an optical electromagnetic radiation (EMR) sensitive detector, such as a charge-coupled device (CCD), or a complementary metal-oxide-semiconductor (CMOS). Suitable imager devices can be optically configured to focus light at the image plane. As will be understood, the image plane can be defined by the image sensor. For example, suitable imager devices can comprise at least one optical component configured to focus optical EMR at the image plane. Optionally, the at least one optical component comprises a lens.

The first image and the at least second image can be obtained by a common imager device comprising at least one image sensor. The method can comprise moving the imager device from the first perspective to the second perspective. In this case, the first and second images can be obtained by the same image sensor. Accordingly, the imager device can comprise a single image sensor.

The optical pattern projector unit and the imager device can be in a fixed spatial relationship relative to each other. The optical pattern projector unit and the imager device unit can be provided as a single probe.

It has been found that providing an optical fixed-pattern projector and imager device that are in a fixed spatial relationship to each other results in multiple equivalent measurements of the same surface which can be averaged together to provide a more accurate representation of the surface. In particular, the phase to height resolution of the images is substantially the same. Accordingly, the method can further comprise averaging topographical data obtained from the first and at least second image in order to provide an averaged topographical data set.

Accordingly, in a particular embodiment, the method can comprise a probe taking the first image of the object, on which the optical pattern is projected via the probe. The method can then comprise moving the probe and the probe then taking the second image of the object on which the optical pattern is projected via the probe. In line with the above described, the probe can comprise at least one image sensor, and at least one projector. Preferably, the probe comprises a single image sensor. Preferably, the probe comprises a single projector. Preferably, the projector projects a fixed pattern, i.e. the projector can be a fixed-pattern projector. The optical pattern projector unit and the imager device can be mounted on a coordinate positioning apparatus, for example a coordinate measuring machine (CMM). In embodiments in which they are provided as a single probe, preferably the probe can be mounted on a coordinate positioning apparatus, for example a CMM.

Step iii) can comprise determining a plurality of different data sets relating to different possible topographies of at least a region of the object and then selecting which data set most accurately represents the at least a region of the object based on data obtained from the second image. Optionally, once the data set has been identified the height information can be used to generate topographical data representing the object from any of the first and at least second images. Optionally, step iii) can comprise determining a plurality of different data sets relating to different possible topographies of at least a region of the object and then selecting a data set to use based on data obtained from the second image. The invention can therefore utilise the ambiguity to determine a number of different data sets relating to different possible topographies from one of the images but then determines which of them to select, for instance as being representative of the topography of the at least a region of the object based on the other image. For example, this could be done by checking the data sets against data obtained from the second image data. The ambiguity can therefore be resolved without the need for a (or a plurality of) special marker feature(s) or the use of photogrammetric techniques. Once selected, the data set can be used in various subsequent processes. For instance, the data set can be used for measuring the at least a region of the object, and/or for checking at least one of the size, form, location, orientation of the at least a region of the object. As will be understood, the number of different data sets which are determined can be deduced from (e.g. can be a factor of) the volume of overlap between the field of view and depth of field of the imaging device and the field of view and depth of field of the projector and the pitch of the fringes.

As will be understood, the use of the terms "first image", "second image" and so on in this document are used to distinguish between the different images obtained from different perspectives and are not used to imply the order in which the images may have been obtained. Accordingly, depending on the particular embodiment, the first image could have been obtained before, after or even at the same time as the second image. As will be understood, the first and second images could be obtained, e.g. captured, as part of the method. Optionally, the images could have been obtained via an imager device, such as a camera, prior to the method of the invention. Accordingly, in this case the method could involve retrieving the images, for example from a memory device or other source.

Furthermore, as will be understood, and as set out in more detail below, taking a first image could comprise taking a plurality of first images obtained from a first perspective, and the plurality of different data sets relating to different possible topographies of at least a region of the object can be determined based on the optical pattern as imaged in at least one of the plurality of first images. Also, taking a second image could comprise taking a plurality of second images obtained from a second perspective, and selecting a data set to use can be based on at least one of the plurality of second images As will be understood, the method can comprise taking at least a third image of the object obtained from at least a third perspective. Step iii) can then comprise selecting at least one data set based on at least one of the second and third images. Using three or more images from different perspectives provides greater redundancy and could enable a more accurate determination of the actual topography. The at least third image can comprise an image of the object on which an optical pattern is projected.

Preferably, the optical pattern extends in two dimensions. Preferably the optical pattern is a substantially periodic optical pattern. As will be understood, a periodic optical pattern can be a pattern which repeats after a certain finite distance. The minimum distance between repetitions can be the period of the pattern. Preferably the optical pattern is periodic in at least one dimension. Optionally, the optical pattern can be periodic in at least two dimensions. The at least two dimensions can be perpendicular to each other.

Preferably the optical pattern as imaged in at least the first image is projected over an area of the object. Preferably the pattern extends over an area of the object so as to facilitate the measurement of a plurality of points of the object over the area using the method of the present invention.

Suitable optical patterns for use with the present invention include patterns of concentric circles, patterns of lines of varying colour, shades, and/or tones. The colour, shades and/or tones could alternate between two or more different values. Optionally, the colour, shade and/or tones could vary between a plurality of discrete values. Preferably, the colour, shade and/or tones varies continuously across the optical pattern. Preferably, the periodic optical pattern is a fringe pattern. For example, the periodic optical pattern is a set of sinusoidal fringes.

The optical pattern can be in the infrared to ultraviolet range. Preferably, the optical pattern is a visible optical pattern. As will be understood, an optical pattern for use in methods such as that of the present invention is also commonly referred to as a structured light pattern.

As will be understood, the topography of at least a region of the object (e.g. the topography data) can comprise at least one of the shape and size of the region of the object. As will be understood, the shape can comprise the surface shape of the at least one region of the object. Preferably, the topography comprises at least the shape and size of the region of the object. The topography can also comprise other information regarding the region of the object, such as at least one of location, orientation and texture. Height data is an example of topography data. That is, the topography of at least a region can comprise data describing its height relative to some known reference, for instance the imaging device, and in particular the imaging plane of the imaging device.

Step iii) can comprise determining which of the plurality of different data sets best corresponds to data obtained from the second image. Step iii) can comprise determining which of the plurality of different data sets best corresponds to data relating to the region of the object obtained from the second image.

A data set can directly describe the topography of the region of the object. For instance, it could comprise data indicating the height of the object's surface relative to the imager device, across the at least one region of the object. The data Set can comprise data indicating the gradient of the object's surface, across the at least one region of the object. Optionally, the data set can comprise data from which the topography can be determined. For instance, the data set can comprise data relating to the optical pattern as imaged. For example, the data set can comprise data describing the optical pattern as imaged. In particular, the data set could comprise data describing the variation or deformation of the optical pattern as imaged. For instance, the data set can comprise data relating to the phase of the optical pattern as imaged.

Step iii) can comprise determining for at least some of the different data sets the part of the second image that corresponds to the region of the object for which the data sets have been obtained. This can improve the efficiency of the method as it need only be necessary to use select parts of the second image.

Determining the part of the second image that corresponds to the region of the object for which the data sets have been obtained can be determined based on the knowledge of the first and second perspectives. The perspectives may be known from measurement equipment reporting the position and/or orientation of the device(s) that obtained the images. For instance, in embodiments in which the images are obtained by an imager device mounted on a coordinate positioning machine, such as a coordinate measurement machine (CMM), then the perspectives can be determined from the machine's measurement sensors. Optionally, the perspectives could be deduced relative to each other from a photogrammetric or other image based technique.

Step iii) can comprise determining which of the plurality of different data sets best corresponds to the form of the data obtained from the second image. Accordingly, the data set that is considered to best correspond to data obtained from the second image might be a data set which has values that are not the same as data obtained from the second image, but that varies in the same way. That is, their absolute values might be different to each other by some substantially constant amount.

The method could comprise determining a plurality of different data sets relating to different possible topographies of at least a region of the object based on the optical pattern as imaged in the second image, and then comparing the different possible data sets based on the second image with those based on the first image to identify those which most closely match.

Optionally, the method comprises for at least some of the data sets relating to different possible topographies based on the first image, predicting data that could be expected to be obtained from the second image, and then comparing the predicted data to what is actually obtained from the second image. The data set obtained from the first image that results in the predicted data most accurately representing what is obtained from the second image can be selected. This can be a good indication that the data set relates to the topography that is likely to reflect the actual topography of the region of the object. This approach can avoid the need to determine a plurality of different data sets relating to different possible topographies based on the second image. In particular, this can mean that only one data set need be obtained from the second image.

Accordingly, the method can comprise, for at least some of the different data sets, extrapolating therefrom data relating to the region of the object as it should be when obtained from the second perspective. The extrapolated data can then be compared with data relating to the region of the object actually obtained from the second image. The data can be extrapolated from knowledge of the first and second perspectives.

The data obtained from the second image could comprise data directly describing the topography of the object. For instance, it could comprise data indicating the height of the object's surface relative to the imager device, across the at least one region of the object. The data could comprise data indicating the gradient of the object's surface, across the at least one region of the object. Optionally, the data comprises data from which the topography can be determined. Optionally, the data obtained from the second image can relate to the optical pattern as imaged from the second perspective. For instance, it could relate to the distortion of the optical pattern as imaged from the second perspective. In particular, it could relate to the phase of the optical pattern as imaged from the second perspective. Likewise, the extrapolated data could directly describe expected topographical data, or expected data from which the topography can be determined, such as for example the expected optical pattern as obtained from the second image (e.g. it could relate to the expected distortion, or even phase, of the optical pattern).

In a particular embodiment, the method can comprise comparing phase map information obtained from each of the first and second images. As will be understood, a phase map is a data map which contains the phase of a pattern projected onto the object's surface for a plurality of pixels in an image.

Accordingly, the method can comprise obtaining a plurality of different possible phase maps from the first image (each of which gives rise to a different possible topography) and using the second image to determine which phase map is the most accurate.

In particular, step iii) can comprise: a) calculating at least one phase map from the first image. This could comprise calculating at least one wrapped phase map. The method could comprise determining a plurality of different possible unwrapped phase maps. This can be done by unwrapping the at least one wrapped phase map. The method could further comprise: b) from the at least one phase map calculating the plurality of different data sets relating to possible topographies for at least the region of the object. Step i) could comprise taking a plurality of first images obtained substantially from the same first perspective, in which the phase of the optical pattern at the surface is changed between the plurality of images. In this case, the at least one phase map could be calculated from the plurality of images using a known phase stepping algorithm. For instance, the at least one phase map could be calculated using a Carré algorithm as described in P. Carre, "Installation et utilisation du comparateur photoelectrique et interferential du Bureau International des Poids et Mesures", Metrologia 2, 13-23 (1966).

Step iii) can further comprise: calculating a phase map from the second image. This can comprise an unwrapped phase map. The unwrapped phase could be generated from a wrapped phase map of the second image. Step iii) could further comprise: for at least some of the plurality of different data sets determined in step b) extrapolate therefrom corresponding phase map data for the second perspective; identifying which calculated phase map data corresponds most closely with the form of a corresponding region of the second image's phase map. The absolute values of the phase map obtained from the second image may be incorrect by some factor (e.g. $2\pi$ radians) but this doesn't affect the form of the phase map and so a reliable determination of the correct phase map obtained from the first image can still be made. Step ii) could comprise taking a plurality of second images obtained substantially from the same second perspective, in which the phase of the optical pattern at the surface is changed between the plurality of images. In this case the phase map could be calculated from the plurality of second images using for instance a known phase stepping algorithm. For instance, the at least one phase map could be calculated using a Carré algorithm.

As understood, steps i), ii) and iii) can be performed under the control of suitable circuitry. Suitable circuitry could comprise a processor. Suitable processors include digital and/or analogue processors. The processor could comprise a single processor unit or a plurality of distinct processor units that cooperate with each other. They could be substantially co-located or located remote from each other in different physical housings. Each step, could be performed under the control of a common processor unit, or separate processor units. In particular, step iii) could be performed by a processor unit separate to a processor unit for performing steps i) and ii). Such processor unit(s) could be dedicated solely to the above mentioned method. For instance, the processor unit could comprise a field programmable gate array (FPGA). Optionally, the processor unit comprises a multi-purpose processor. For example, any or all of steps i) to iii) could be performed under the control of software running on at least one general purpose processor. For instance, any or all of steps i) to could be performed by software running on a general purpose personal computer (PC).

Accordingly, as described above, and also in more detail below, there is provided a method of inspecting an object, comprising: i) taking a first image of the object, obtained from a first perspective, on which an optical pattern is projected; ii) taking a second image of the object, obtained from a second perspective; and iii) based on the optical pattern as imaged in the first image determining a plurality of different data sets relating to different possible topographies of at least a region of the object and then selecting a data set to use based on data obtained from the second image.

According to a second aspect of the invention there is provided an apparatus for non-contact inspection of an object, comprising: at least one projector for projecting an optical pattern onto the object to be inspected; at least one imager device for obtaining a first and at least a second image of the object, from first and at least second perspectives, on which the optical pattern is projected; and an analyser configured to determine the topography of at least a region of the object based on the optical pattern as imaged in the first image in which phase data obtained from a corresponding region of the object as imaged in the second image is used to resolve any ambiguity in the phase or topography data obtained from the first image, and in which the optical pattern, as it falls on the object, in the second image differs to that in the first image.

Accordingly, as described above, and also in more detail below, there is provided an apparatus for non-contact inspection of an object, comprising: at least one projector for projecting an optical pattern onto the object to be inspected; at least one imager device for obtaining a first and at least a second image of the object, from first and at least second perspectives, on which the optical pattern is projected in at least the first image; and an analyser configured to determine a plurality of different data sets relating to different possible topographies of at least a region of the object based on the optical pattern as imaged in the first image and to select a data set based on the second image.

An embodiment of the invention will now be described, by way of example only, with reference to the following Figures, in which.

Figure 13:
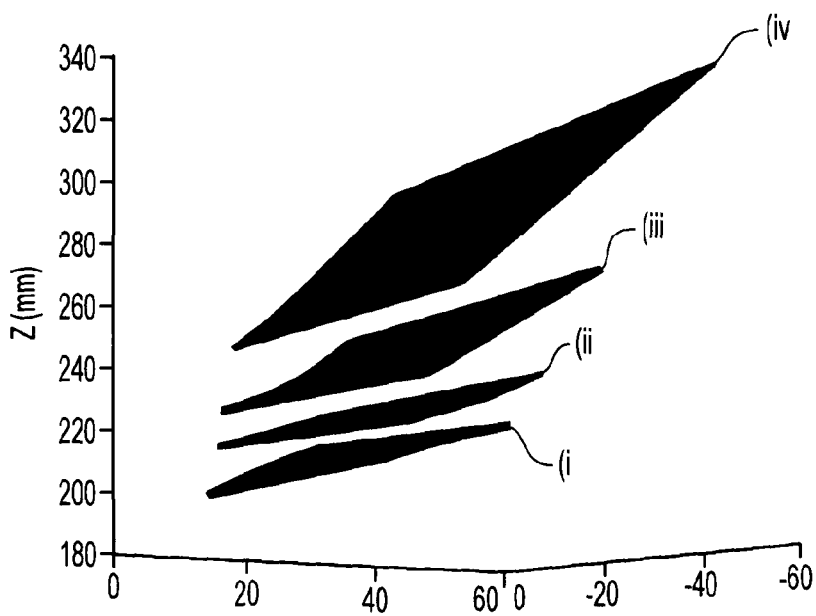
FIG. 13 illustrates different topographical data sets—each one being obtained from one of the plurality of possible unwrapped phase maps shown in FIG. 12(b)
Figure 14:
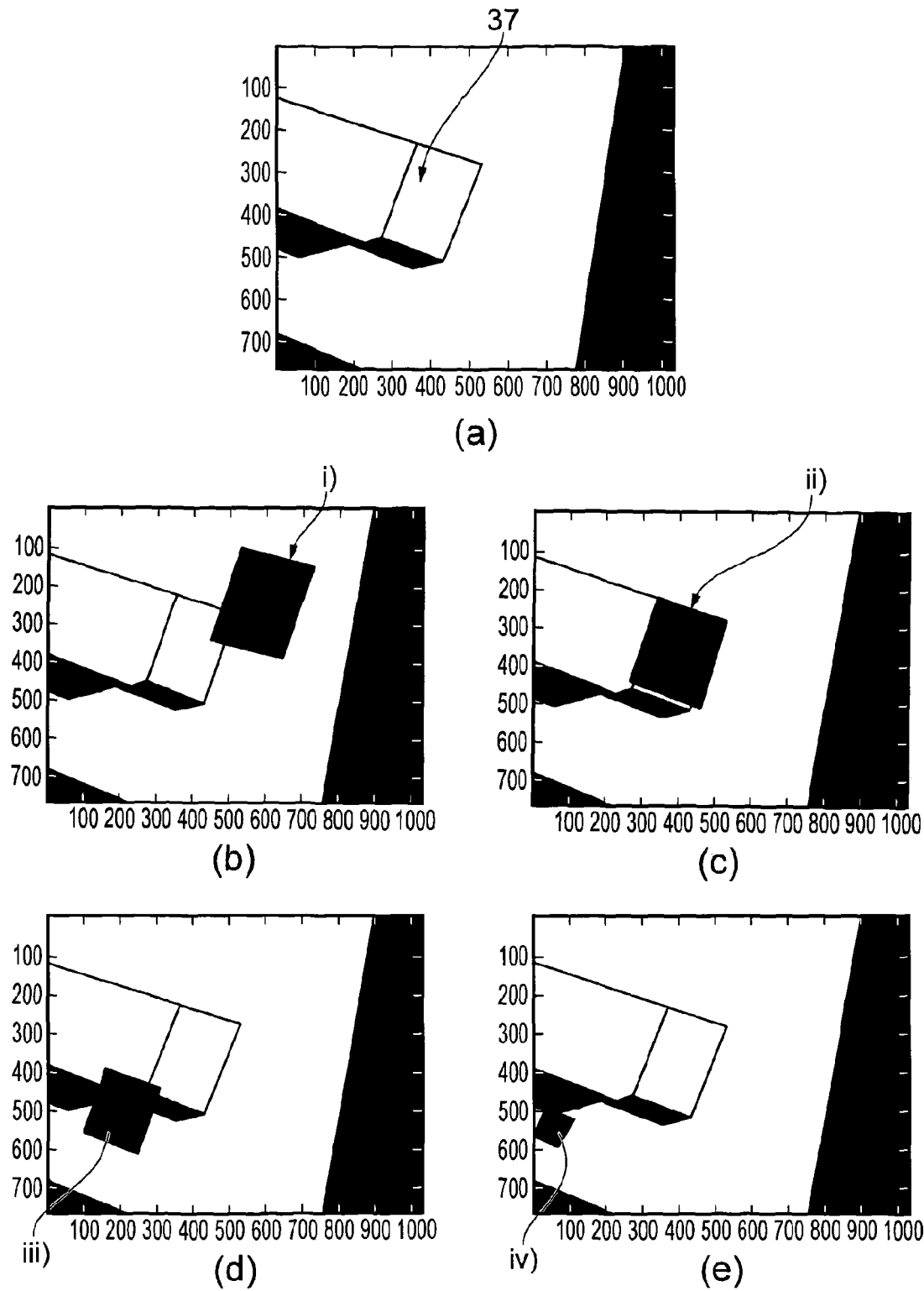
Figure 15:
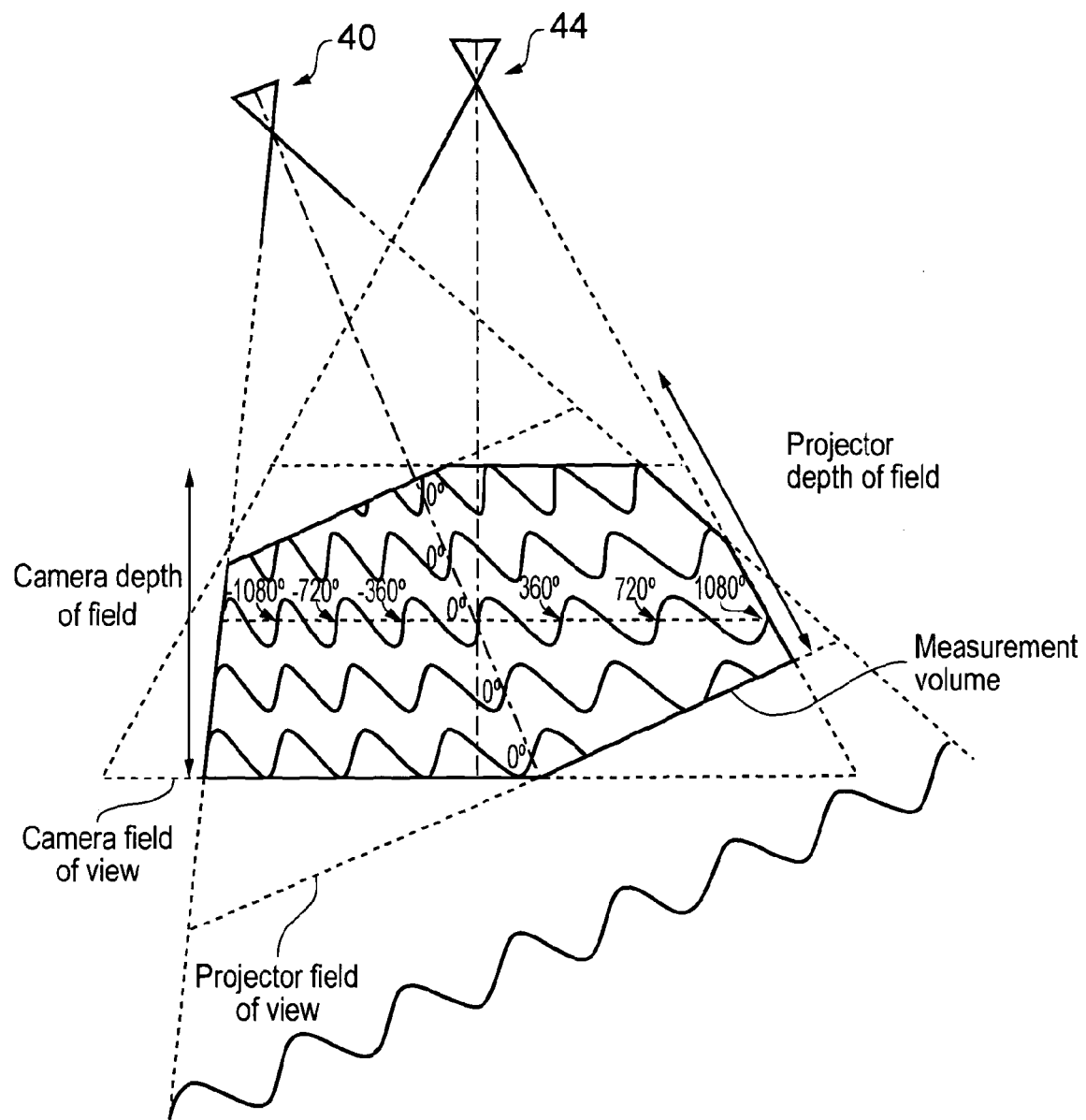

FIGS. 14(a) to (e) illustrate the overlap of the predicted unwrapped phase data calculated from the different topographical data sets shown in FIG. 13 onto an unwrapped phase map for an image obtained from the second perspective; and FIG. 15 illustrates the relationship between the range of possible unwrapped phase maps and the projector/camera setup.

Figure 1:
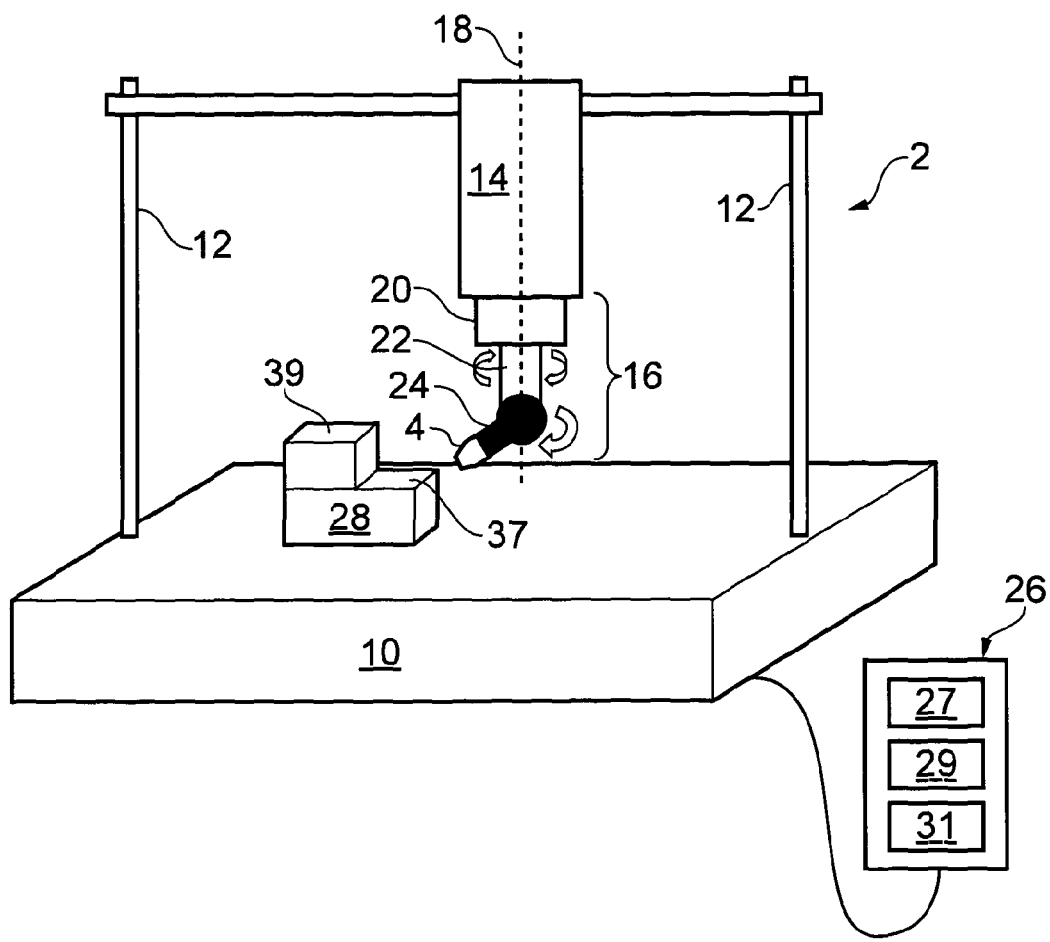
FIG. 1 shows a schematic isometric view of a coordinate measuring machine on which a probe for measuring an object via a non-contact method according to the present invention is mounted.

Referring to FIG. 1, a coordinate measuring machine (CMM) 2 on which a measurement probe 4 according to the present invention is mounted, is shown.

The CMM 2 comprises a base 10, supporting a frame 12 which in turn holds a quill 14. Motors (not shown) are provided to move the quill 14 along the three mutually orthogonal axes X, Y and Z. The quill 14 holds an articulating head 16. The head 16 has a base portion 20 attached to the quill 14, an intermediate portion 22 and a probe retaining portion 24. The base portion 20 comprises a first motor (not shown) for rotating the intermediate portion 22 about a first rotational axis 18. The intermediate portion 22 comprises a second motor (not shown) for rotating the probe retaining portion 24 about a second rotational axis that is substantially perpendicular to the first rotational axis. Although not shown, bearings may also be provided between the moveable parts of the articulating head 16. Further, although not shown, measurement encoders may be provided for measuring the relative positions of the base 10, frame 12, quill 14, and articulating head 16 so that the position of the measurement probe 4 relative to a workpiece located on the base 10 can be determined.

The probe 4 is removably mounted (e.g. using a kinematic mount) on the probe retaining portion 24. The probe 4 can be held by the probe retaining portion 24 by the use of corresponding magnets (not shown) provided on or in the probe 4 and probe retaining portion 24.

The head 16 allows the probe 4 to be moved with two degrees of freedom relative to the quill 14. The combination of the two degrees of freedom provided by the head 16 and the three linear (X, Y, Z) axes of translation of the CMM 2 allows the probe 4 to be moved in five degrees of freedom.

A controller 26 is also provided, comprising a CMM controller 27 for controlling the operation of the CMM 2, a probe controller 29 for controlling the operation of the probe 4 and an image analyser 31 for analysing the images obtained form the probe 4. The controller 26 may be a dedicated electronic control system and/or may comprise a personal computer. Also, the CMM controller 27, probe controller 29 and image analyser 31 need not be part of the same physical unit as shown in FIG. 1, for instance they could be provided by separate physical devices.

It should be noted that FIG. 1 provides only a top level description of a CMM 2. A more complete description of such apparatus can be found elsewhere; for example, see EP0402440 the entire content of which is incorporated herein by this reference.

Figure 2:
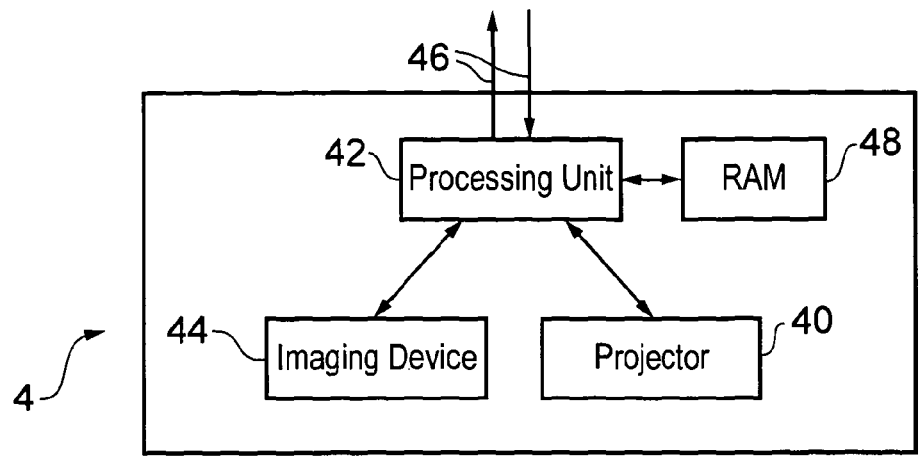
FIG. 2 is a schematic diagram of the components of the probe shown in FIG. 1.

Referring now to FIG. 2, the probe 4 comprises a projector 40 for projecting, under the control of a processing unit 42 a fringe pattern onto the object 28, and an imager device 44 for obtaining, under the control of the processing unit 42 an image of the object 28 onto which the fringe pattern is projected. As will be understood, the imager device 44 comprises suitable optics and sensors for capturing images of the object 28. In the embodiment described, the imager device comprises an image sensor, in particular a CCD defining an image plane 62. The imager device 44 also comprises a lens (not shown) to focus light at the image plane 62.

The processing unit 42 is connected to the probe controller 29 and image analyser 31 in the controller unit 26 such that the processing unit 42 can communicate with them via a communication line 46. As will be understood, the communication line 46 could be a wired or wireless communication line. The probe 4 also comprises a random access memory (RAM) device 48 for temporarily storing data, such as image data, used by the processing unit 42.

As will be understood, the probe 4 need not necessarily contain the processing unit 42 and/or RAM 48. For instance, all processing and data storage can be done by a device connected to the probe 4, for instance the controller 26 or an intermediate device connected between the probe 4 and controller 26.

Figure 3:
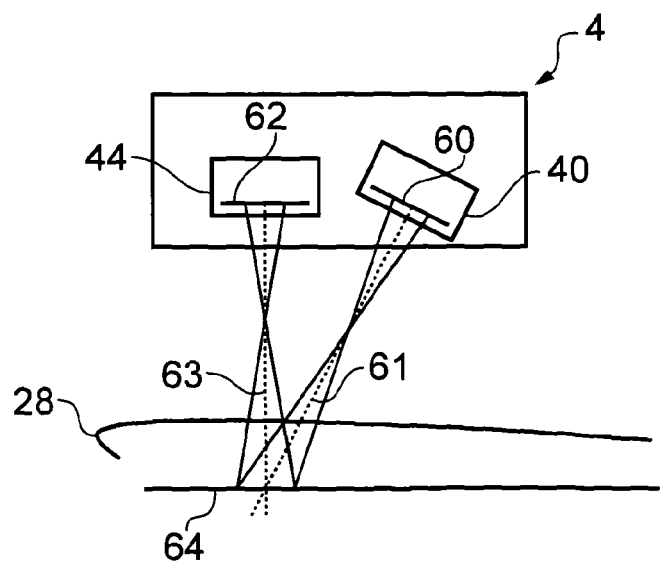
FIG. 3 is a schematic diagram of the positional relationship of the imager device and projector of the probe shown in FIG. 2

As illustrated in FIG. 3, the projector's 40 image plane 60 and the imager device's 44 image plane 62 are angled relative to each other such that the projector's 40 and imager device's optical axes 61, 63 intersect at a reference plane 64. In use, the probe 4 is positioned such that the fringes projected onto the object's surface can be clearly imaged by the imager device 44.

Figure 4:
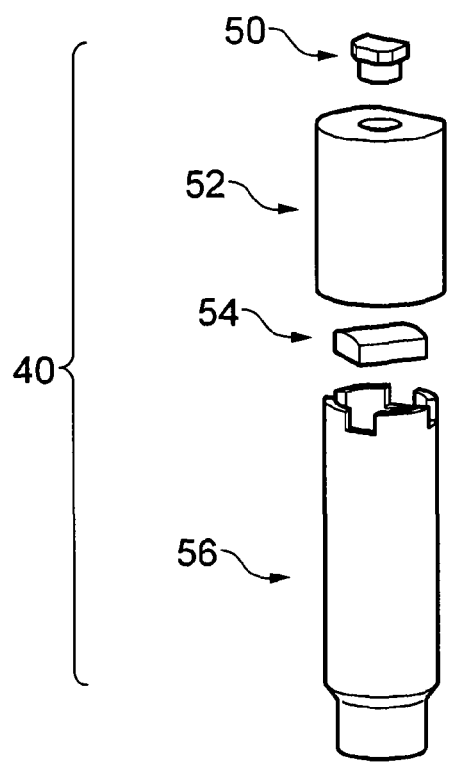
FIG. 4 is a schematic diagram of the projector shown in FIG. 2.

With reference to FIG. 4, the projector 40 comprises a laser diode 50 for producing a coherent source of light, a collimator 52 for collimating light emitted from the laser diode 50, a grating 54 for producing a sinusoidal set of fringes, and a lens assembly 56 for focussing the fringes at the reference plane 64. As will be understood, other types of projectors would be suitable for use with the present invention. For instance, the projector could comprise a light source and a mask to selectively block and transmit light emitted from the projector in a pattern.

In the described embodiment, the periodic optical pattern projected by the projector 40 is a set of sinusoidal fringes. However, as will be understood, other forms of structured light could be projected, such as for example a set of parallel lines having different colours or tones (e.g. alternating black and white lines, or parallel red, blue and green lines), a set of concentric circles, or even patterns of dots, squares or other regular or irregular shapes. Furthermore, in the embodiment described, the projector 40 can project only one optical pattern. That is to say that its projectable optical pattern is fixed. Accordingly, as described in more detail below, the optical pattern as it falls on the object differs for the first and second images solely by virtue of the movement of the projector between the first and second images being obtained.

Referring to FIGS. 5 to 14, the operation of the probe 4 will now be described.

Figure 5:
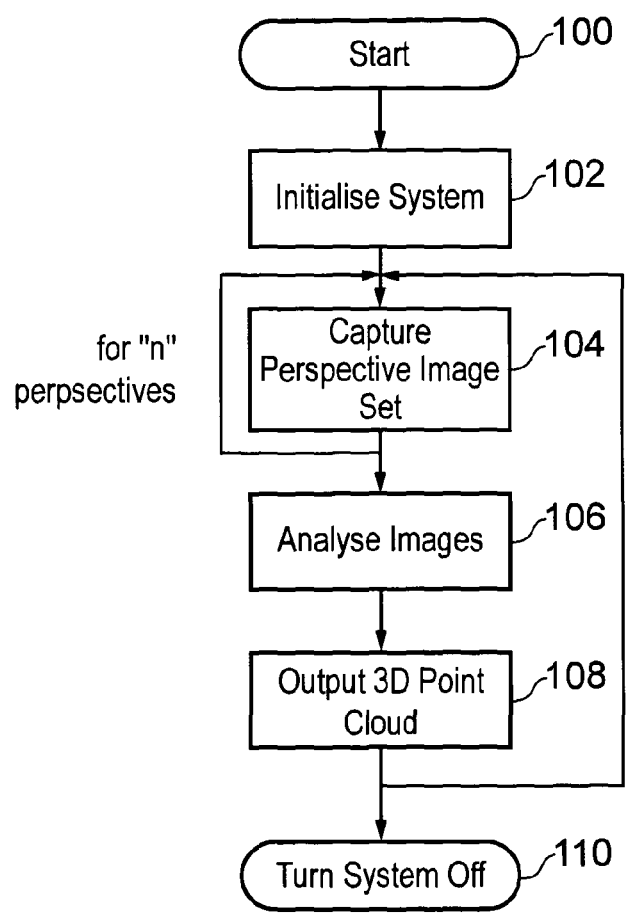
FIG. 5 shows a flow chart illustrating the high-level operation of the apparatus shown in FIG. 1.

Referring first to FIG. 5, the operation begins at step 100 when the operator turns the CMM 2 on. At step 102, the system is initialised. This includes loading the probe 4 onto the articulating head 16, positioning the object 28 to be measured on the base 10, sending the CMM's encoders to a home or reference position such that the position of the articulating head 16 relative to the CMM 2 is known, and also calibrating the CMM 2 and probe 4 such that the position of a reference point of the probe 4 relative to the CMM 2 is known. At least part of the initialisation step 102 can be performed under the control of the controller 26.

Once initialised and appropriately calibrated, control passes to step 104 at which point a set of images of the object 28 is obtained by the probe 4, under the control of the CMM controller 27 and probe controller 29 in the controller 26. This step is performed a plurality of times so that a plurality of image sets are obtained, wherein each set corresponds to a different perspective or view point of the object 28. In the example described, two sets of images are obtained corresponding to two different perspectives. The process of obtaining a set of images is explained in more detail below with respect to FIG. 6. As described in more detail below, depending on the particular method by which wrapped phase maps are obtained, it is not essential that a set of images are obtained for each perspective. It is possible for the invention to be implemented via obtaining just one image at each perspective.

Once all of the images have been obtained, the images are analysed at step 106 by the image analyser 31 in the controller 26. The image analyser 31 calculates from the images a set of three dimensional ("3D") coordinates relative to the CMM 2 which describe the shape of at least a part of the object 28 in a 3D measurement space. The method of analysing the images will be described in more detail below with reference to FIG. 7. The 3D coordinates are then output at step 108 as a 3D point cloud. As will be understood, the 3D point cloud could be stored on a memory device for later use. The 3D point cloud data could be used to determine the shape and dimensions of the object and compare it to predetermined threshold data to assess whether the object 28 has been made within predetermined tolerances. Optionally, the 3D point cloud could be displayed on a graphical user interface which provides a user with virtual 3D model of the object 28.

The operation ends at step 110 when the system is turned off. Alternatively, a subsequent operation could be begun by repeating steps 104 to 108. For instance, the user might want to obtain multiple sets of measurement data for the same object 28, or to obtain measurement data for a different object.

Figure 6:
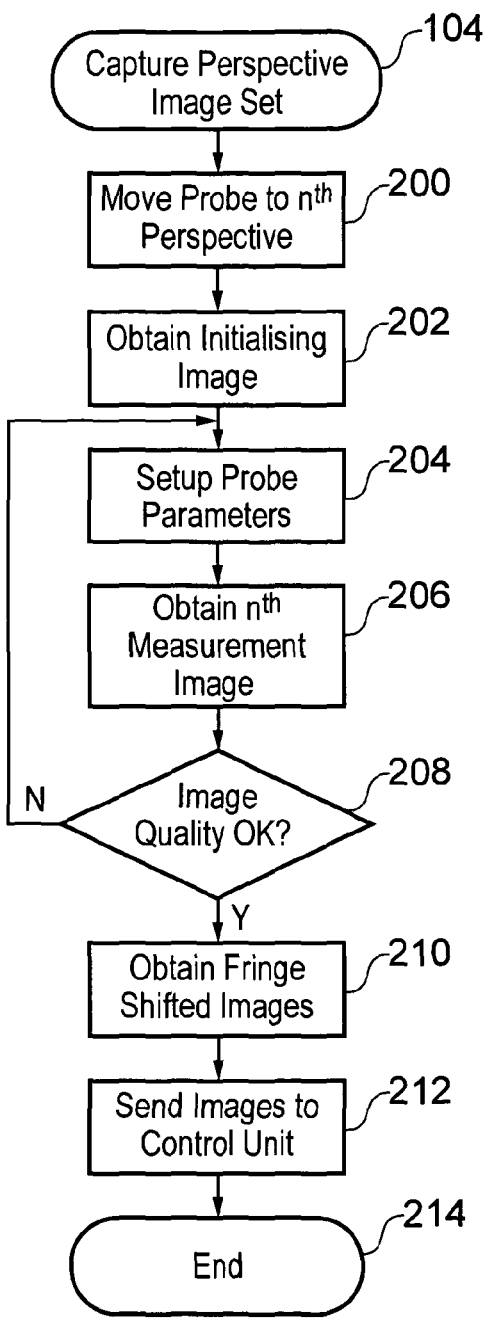
FIG. 6 illustrates the method of capturing a perspective image set.

Referring now to FIG. 6, the process 104 of capturing an image set for a perspective will now be described. The process begins at step 200 at which point the probe 4 is moved to a first perspective. In the described embodiment, the user can move the probe 4 under the control of a joystick (not shown) which controls the motors of the CMM 2 so as to move the quill 14. As will be understood, the first (and subsequent) perspective could be predetermined and loaded into the CMM controller 27 such that during the measurement operation the probe 4 is automatically moved to the predetermined perspectives. Further, on a different positioning apparatus, the user could physically drag the probe 4 to the perspectives, wherein the positioning apparatus monitors the position of the probe 4 via, for example, encoders mounted on the moving parts of the apparatus.

Once the probe 4 is positioned at the first perspective, an initialising image is obtained at step 202. This involves the probe controller 29 sending a signal to the processing unit 42 of the probe 4 such that it operates the imager device 44 to capture an image of the object 28.

The initialising image is sent back to the image analyser 31 and at step 204, the image is analysed for image quality properties. This can include, for example, determining the average intensity of light and contrast of the image and comparing them to predetermined threshold levels to determine whether the image quality is sufficient to perform the measurement processes. For example, if the image is too dark then the imager device 44 or projector 40 properties could be changed so as to increase the brightness of the projected fringe pattern and/or adjust the expose time or gain of the imager device 44. In the described embodiment, the initialising image will not be used in subsequent processes for obtaining measurement data about the object 28 and so certain aspects of the image, such as the resolution of the image, need not be as high as that for the measurement images as discussed below. However, as will be understood, the initialising image could be used to obtain measurement data during the "analyse images" process 106 if desired. Furthermore, in alternative embodiments, a light sensor, such as a photodiode, separate to the imager device could be provided in the probe to measure the amount of light at a perspective position, the output of the photodiode being used to set up the projector 40 and/or imager device 44.

As will be understood, the steps of obtaining an initialising image 202 and setting up the probe parameters 204 are optional. For instance, the probe 4 could be set up prior to operation, and/or the probe 4 could be set up in another way. For example, the user could set up the probe by manually configuring it, either before or during operation.

Once the projector 40 and imager device 44 have been set up, the first measurement image is obtained at step 206. What is meant by a measurement image is one which is used in the "analyse images" process 106 described in more detail below. Obtaining the first measurement image involves the probe controller 29 sending a signal to the processing unit 42 of the probe 4 such that the processing unit 42 then operates the projector 40 to project a fringe pattern onto the object 28 and for the imager device 44 to simultaneously capture an image of the object 28 with the fringe pattern on it.

The first measurement image is sent back to the image analyser 31 and at step 208, the first measurement image is again analysed for image quality properties. If the image quality is sufficient for use in the "analyse images" process 106 described below, then control is passed to step 210, otherwise control is passed back to step 204. As will be understood, the step of checking the image quality 208 is optional—it could be assumed that the image quality is sufficient for use in the "analyse image" process 106.

At step 210, phase shifted images are obtained for the current perspective. Phase shifted images are a plurality of images of the object from substantially the same perspective but with the position of the fringes being slightly different in each image.

There are many known ways of obtaining phase shifted images. For instance, U.S. Pat. No. 6,100,984 discloses a projector which uses a computer controlled liquid crystal system to change the pitch and phase of a fringe pattern emitted between obtaining photographs. WO 0151887 also discloses a structured light analysis system which has a fringe projector comprising an internal refractor which can be manipulated to change the position of the projected fringe on the object and hence the phase of the fringe at the object's surface, and also discloses moving the object to reposition the fringe on the object. International patent application PCT/GB2008/002759 (publication no. WO2009/024757), also discloses a method for obtaining phase shifted images which comprises moving the projector relative to the object to cause a change in the position of the projected fringe on the object by a fraction of the fringe pitch whilst still maintaining substantially the same perspective view of the object. Such a method is particularly suitable for use with the probe 4 of the currently described embodiment as it doesn't require the projector to change the fringe projected. The entire content of WO2009/024757 is incorporated into this specification by this reference.

As described in more detail below, the phase shifted images are used in the generation of a phase map which describes, for at least a part of one image for a given perspective, the phase of a fringe pattern as imaged. As will be understood, it is not necessary to obtain a set of phase shifted images in order to do this. For instance, a phase map could be obtained by performing a Fourier transform on just one image of the fringe pattern. Accordingly, depending on the method used, the step 210 of obtaining phase shifted images is optional.

Once the phase shifted images have been obtained, all of the images are then sent back to the imager analyser 31 for analysis at step 212. As will be understood, data concerning the position and orientation that the probe 4 was at when each image was obtained will be provided to the image analyser 31 along with each image, such that 3D coordinates of the object 28 relative to the CMM 2 can be obtained as explained in more detail below. The process then ends at step 214.

As explained above, the capture perspective image set process 104 is repeated a plurality of times for a plurality of different perspectives. In this described example, the capture perspective image set process is performed twice, for first and second perspectives. The probe 4 is moved to each perspective either under the control of the user or controller 26 as explained above.

Figure 9:
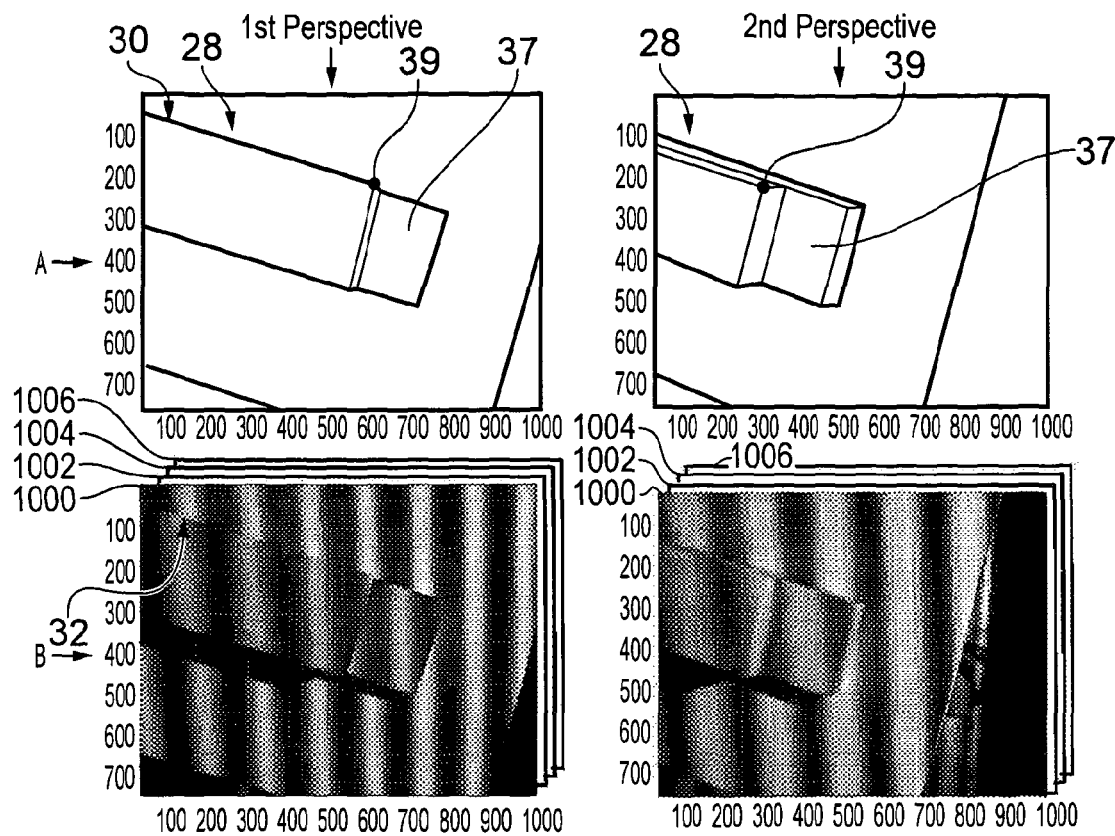
FIG. 9 illustrates various images of the object shown in FIG. 1 obtained by the probe from two different perspectives.
Figure 10:
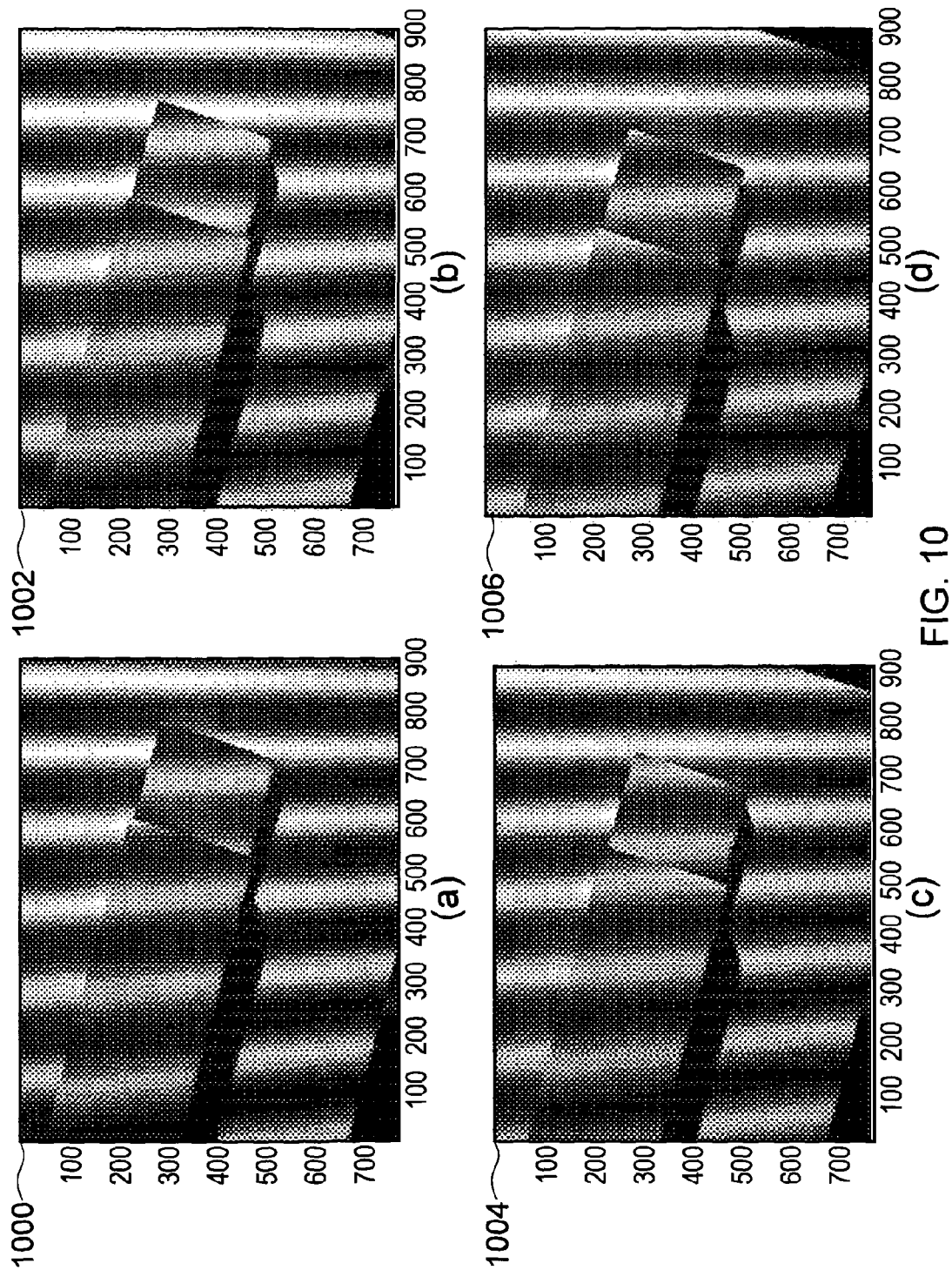
FIG. 10 illustrates a set of fringe shifted images, the position of the fringe on the object being different in each image.

Examples of the types of images obtained during the above steps are shown in FIGS. 9 and 10. In particular, row A of FIG. 9 shows the view of the object 28 at both of the two perspectives with no fringes projected onto it. Row B illustrates, for each of the first and second perspectives the image 1000 that will be obtained by the imager device 44 at step 206 of the process for capturing a perspective image set 104. Schematically shown behind each of those images 1000 are the fringe shifted images 1002, 1004 and 1006 which are obtained during execution of steps 300 and 302 for each of the first and second perspectives. FIGS. 10(*a*) to 10(*d*) show examples of the fringe shifted images 1000-1006 obtained for the first perspective.

Figure 7:
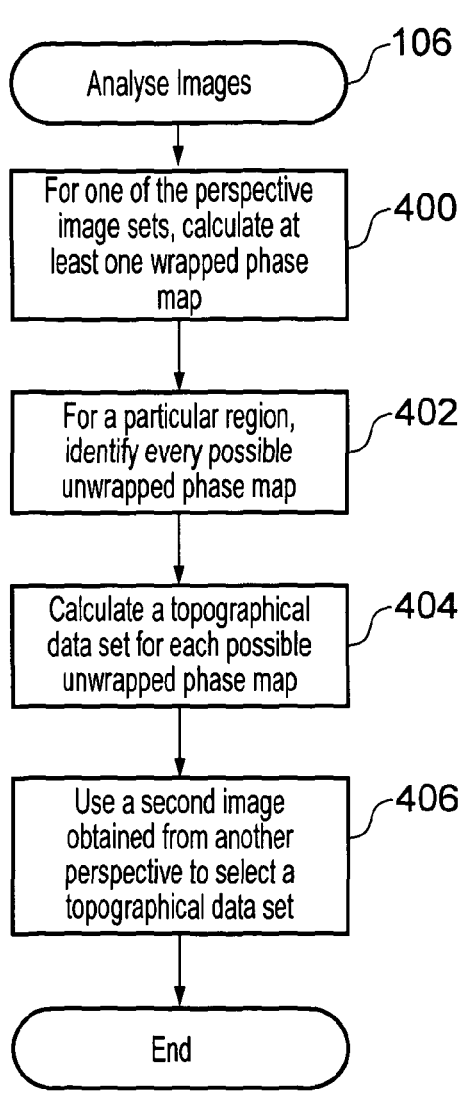
FIG. 7 illustrates the method of analysing the images.
Figure 8:
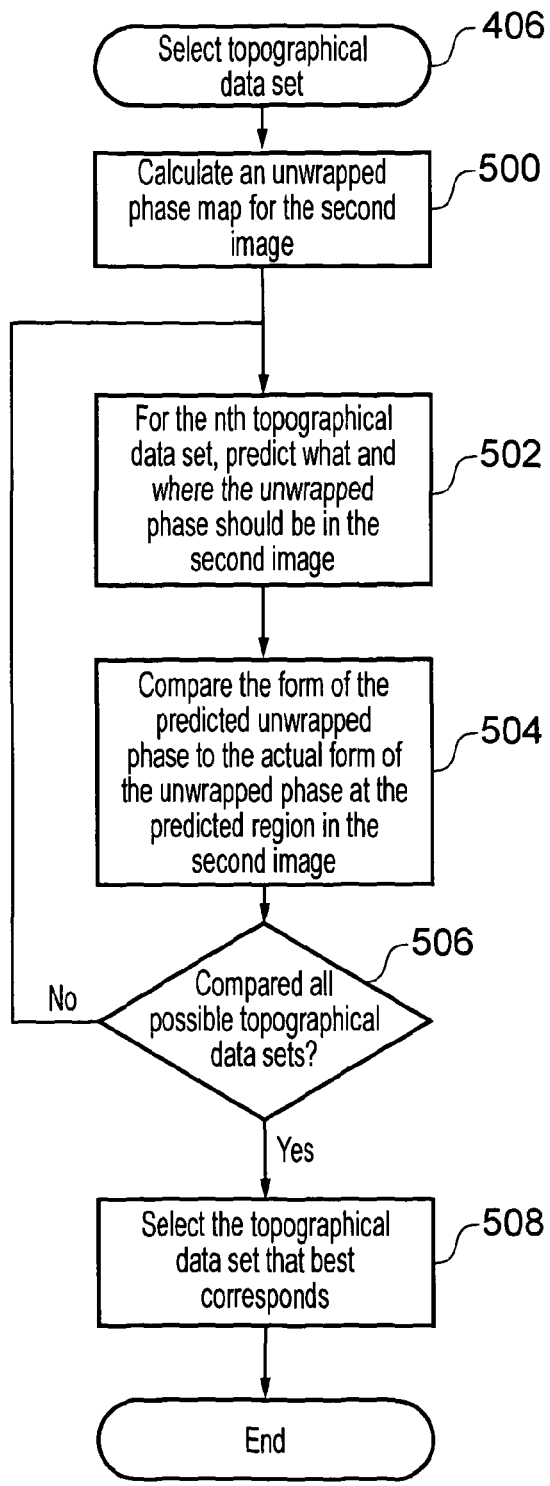
FIG. 8 illustrates the method of selecting the most accurate topographical data set.
Figure 11:
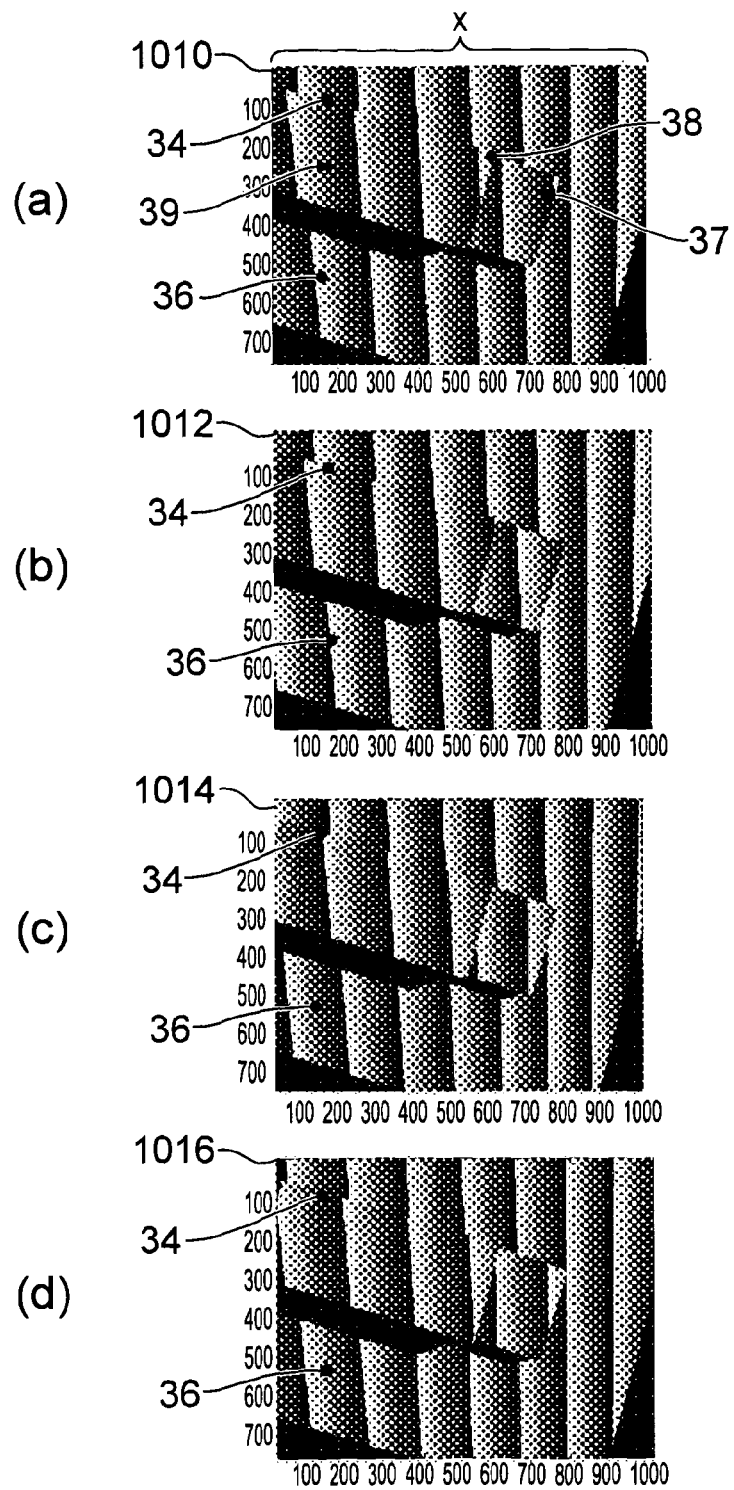
FIG. 11 illustrates a plurality of wrapped phase maps for a first perspective.

The process 106 for analysing the images will now be described with reference to FIG. 7. The process begins at step 400 at which at least one wrapped phase map is calculated for the first perspective. As will be understood, a wrapped phase map is a map which contains the phase of the fringes projected onto the object's surface for a plurality of pixels in one of the measurement images in a perspective image set, where the phase angle is bound within a range of 360 degrees (i.e. $2\pi$ radians. As will be understood, references to 360 degrees and $2\pi$ radians are interchangeable). FIG. 11(*a*) is an illustration of a wrapped phase map calculated for the first perspective.

There are many known ways of calculating a wrapped phase map. These include performing a Fourier Transform on just one image of the fringe on the object or using a known phase-shifting algorithm to calculate the wrapped phase at each pixel. A suitable phase-shifting algorithm, for instance the Carré algorithm as described in P. Carre, "Installation et utilisation du comparateur photoelectrique et interferential du Bureau International des Poids et Mesures", Metrologia 2, 13-23 (1966), may be used to calculate the wrapped phase, phase shift and modulation amplitude.

At step 402, a region of the image to be analysed is identified. Depending on the object and on the desired result, the region could comprise the whole of the image. This may be for instance, when the image is only of a part of an object that is substantially flat, or smoothly varying in shape. Optionally, it may be desired that only a part of the image is analysed. This may be for instance when only a particular region of the object is of interest. This may also be for instance when the object comprises a plurality of faces and they are to be analysed individually. The embodiment described below deals with the latter situation, and in particular is concerned with identifying and determining the topographical data for the region 37 which corresponds to the middle-top surface 37 of the object 28.

In the case where different faces are to be analysed individually, this can comprise identifying where those faces are in the image. One way of doing this can comprise looking for discontinuities in the fringe pattern as imaged. This is because sharp features will cause a step change in the fringe pattern. This in turn results in a discontinuity in the wrapped phase map. This is illustrated in FIG. 11(*a*) in which it can be seen that there is a step change in the phase along the edges of the object (for example see the step change in phase on the edge at point 34).

However, discontinuities also exist due to the wrapped nature of the phase map. For example, adjacent pixels might have phase values of, for instance, close to 0 degrees and 360 degrees respectively. If so, then it would appear as if there has been a large phase jump between those pixels and this would be identified as a discontinuity. However, the phase jump has merely been caused as a result of the wrapping around of the phase, rather than due to a discontinuity in the surface of the object being measured. An example of this can be seen in the FIG. 11(*a*) at point 36 where the phase values jump from 360 degrees to 0 degrees (illustrated by the dark pixels and light pixels respectively). The phase value for adjacent pixels will jump significantly at point 36 due to the phase map being wrapped.

Accordingly, it can be advantageous to determine which discontinuities are caused by features of the object and which are caused by the wrapped nature of the phase map. One way of achieving this can be to use image processing techniques such as Canny edge detection, as described in J. R. Parker, "Algorithms for image processing and computer vision", Wiley Computer Publishing (1997), to identify where the edges of the object are in the images and/or to identify which discontinuities are those caused by the object. Accordingly, in this case only one wrapped phase map is needed. Another method, as described in WO2009/024757 includes obtaining a plurality of wrapped phase maps using each of the phase shifted images for that perspective in different orders. The wrapped phase maps can then be compared to identify common discontinuities—thereby indicating edges of the object. FIGS. 11(b) to (d) illustrate wrapped phase maps generated using the same four images as used to generate the wrapped phase map in FIG. 11(a) but in different orders. As can be seen, the discontinuity at point 36 in FIG. 11(a) doesn't exist in the other wrapped phase maps and so can safely be discarded as a "false" discontinuity. Accordingly, once all of the real discontinuities have been identified it is then possible to split the wrapped phase map into a number of regions.

The next stage comprises unwrapping the wrapped phase map in an identified region to create an unwrapped phase map for that region. This involves adding or subtracting integer multiples of 360 degrees to the wrapped phase of select individual pixels as required to remove the discontinuities found due to the phase calculation algorithm. However, as will be understood, to obtain the correct unwrapped phase map involves knowing the correct value of the unwrapped phase map at at least one point, or knowing the absolute distance between the camera and the object for at least one point (so that the correct phase for at least one point can be calculated). This needs to be known so that it is determined where the addition or subtraction of 360 degrees should start. If it is not known, then the unwrapped phase map could be incorrect by any multiple of $2\pi$ radians (i.e. 360 degrees). At this stage in the described process, neither the correct absolute phase nor the absolute distance is known. Accordingly, the example method involves calculating all possible unwrapped phase maps—one of the unwrapped phase maps will be the correct one, whilst the others will be incorrect by some multiple of $2\pi$.

Figure 12A:
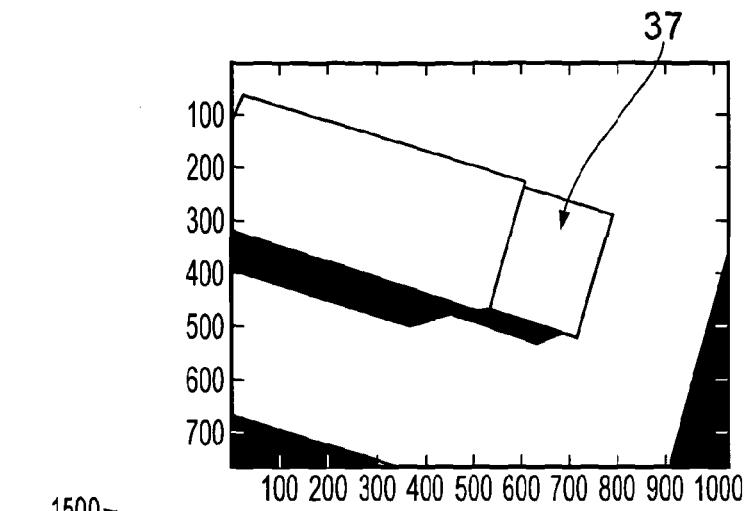
FIG. 12(a) illustrates a possible unwrapped phase map for the first perspective.
Figure 12B:
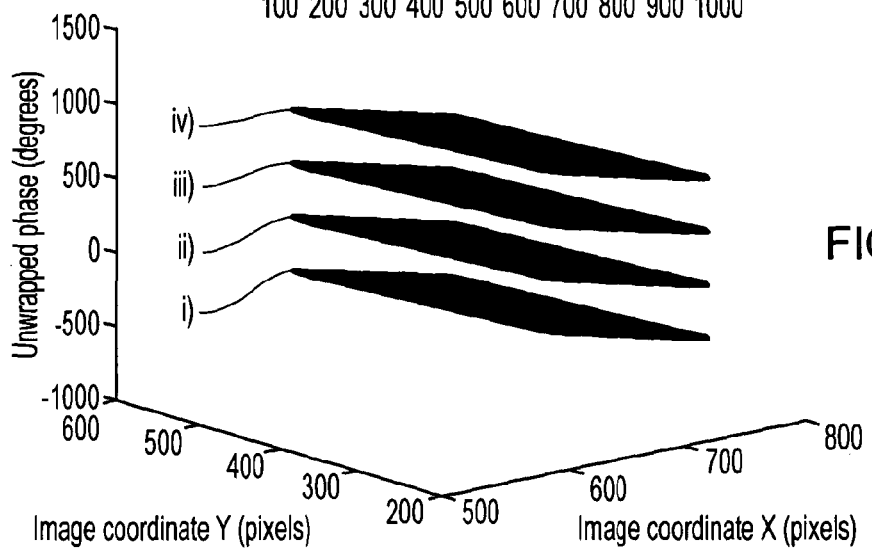
FIG. 12(b) illustrates a set of possible unwrapped phase maps for a particular region of the image obtained from the first perspective.

With reference to FIG. 12(a) there is shown one possible unwrapped phase map for the image obtained at the first perspective. The unwrapped phase map in FIG. 12(a) is calculated for each region of interest in turn by, for each region, taking a point in the region as representing a particular given phase value on the wrapped phase map as a starting point (e.g. a line at which the phase changes from 360° to 0° as representing the 0° phase, for instance the first whole white line toward the left-hand side of the region 37 in FIG. 11(a)), and then at appropriate points some multiple of 360° is added to the phase value at each pixel so as to avoid wrapping of the phase each time the phase wraps around to 0°. In the unwrapped phase map shown in FIG. 12(a), the unwrapped phase is calculated for the middle-top surface 37 of the object 28, the top surface 39 of the object 28, as well as for the surface on which object 28 sits. Data set i) in FIG. 12(b) illustrates the unwrapped phase map calculated for the middle-top surface region 37 shown in FIG. 12(a).

The method further comprises calculating all of the other possible unwrapped phase maps for a particular region of interest. These are generated simply by adding (or subtracting) multiples of 360° to the data in the first unwrapped phase map. Accordingly, data sets ii) to iv) shown in FIG. 12(b) illustrate the other possible unwrapped phase maps for region 37 generated in this way. Although not known at this stage in the process, for the sake of explanation of the method of the invention, the unwrapped phase map ii) is the correct unwrapped phase map.

As will be understood, the number of possible unwrapped phase maps is limited by the dimensions of the measurement volume of the fringe projection probe and the pitch of the projected fringes. One can consider that the volume over which an optical system can operate is bounded by projecting the field of view of an optical system through the depth of field of that optical system. The probe combines two optical systems to produce measurements. The dimensions of the measurement volume can therefore be deduced from the volume of overlap between the field of view and depth of field of the camera and the field of view and depth of field of the projector.

For example in FIG. 15, the total phase range is −1440 degrees to 1080 degrees and so there are at most 8(=(1080−1440)/360+1) possible unwrapped phase values for any wrapped phase value. Any unwrapped phase outside of this range corresponds to a 3D point outside the measurement volume of the camera and projector.

Accordingly, the number of possible unwrapped phase maps is limited by the measurement volume of the fringe projection probe and the pitch of the projected fringes.

Step 404 involves creating a topographical data set for each unwrapped phase map generated at step 402. In the method described, this involves converting the unwrapped phase map to a height map for the identified region. The phase for a pixel is dependent on the distance to the surface of the object. It is possible therefore to create a height map for the region from that phase map by directly mapping the phase value of each pixel to a height value using a predetermined mapping table and procedure. Accordingly, the topographical data created is dependent on the unwrapped phase map. Not only will the calculated location of the topographical data in the 3D space be dependent on the unwrapped phase map, but also the form (e.g. shape) of the object as described by the topographical data will be dependent on the unwrapped phase map.

Accordingly, after step 404, there will be a number of different possible topographical data sets that will have been calculated for a particular region. Data sets i) to iv) in FIG. 13 respectively illustrate the topographical data sets obtained for the middle-top surface region 37 of the object for each of the different unwrapped phase maps i) to iv) shown in FIG. 13(b). Accordingly, data set ii) is likely to be the most accurate representation of the actual topography of the middle-top surface region 37 of the object and so is selected for subsequent use. The following description sets out how this is established using the method of the invention.

Step 406 involves determining which of those different possible topographical data sets should be selected by using the image obtained from the second perspective. The steps involved in doing this will now be described in more detail in connection with FIG. 8.

The method begins at step 500 at which point an unwrapped phase map is obtained from the second image. As will be understood, this will involve generating a wrapped phase map using any of the above described methods and then unwrapping it by adding (or subtracting) integer multiples of 360 degrees (i.e. $2\pi$ radians) to the wrapped phase of individual pixels as required to remove the discontinuities found due to the phase calculation algorithm. FIG. 14(a) is an example of an unwrapped phase map for the second perspective. Like with the unwrapping of the phase maps for the first perspective, the correct absolute phase is not known. Accordingly, there are again multiple possible phase maps that can be generated, only one of which is correct. Nevertheless, it is only necessary to create one unwrapped phase map for the second perspective and it doesn't matter for the purposes of the presently described embodiment if it is incorrect by some multiple of $2\pi$ radians (i.e. 360 degrees). This is because, as described below, the correct topographical data is selected by comparing the predicted unwrapped phase form with that of the unwrapped phase map for the second perspective. The form of the unwrapped phase map is not affected by the $2\pi$ error—only the absolute value is.

The next step 502 involves taking one of the topographical data sets obtained during step 404, and assuming that the selected topographical data set was generated from the correct unwrapped phase map, predicting for that topographical data set its corresponding unwrapped phase and location of the unwrapped phase in the second perspective's unwrapped phase map. This can be done based on the knowledge of the position and orientation of the camera at each perspective. At step 506 the form of the predicted unwrapped phase map is then compared with the form of the actual unwrapped phase map at the determined location to determine how closely their forms match. This is repeated for each of the different calculated topographical data sets. Not only will the form of the predicted unwrapped phase maps generated from the incorrect topographical data (which in turn were based on incorrect unwrapped phase maps) not match the part of the actual unwrapped phase map corresponding to middle-top surface 37 obtained from the second image, but the predicted location of the corresponding part of the unwrapped phase map actually obtained from the second image with which they will be compared will also be wrong. Accordingly, only the predicted unwrapped phase map obtained from the most accurate topographical data (i.e. obtained from the correct unwrapped phase map of the first image) will be compared with the part of the unwrapped phase map obtained from the second image that actually corresponds to the middle-top surface region 37.

This process is schematically illustrated in FIGS. 14(*b*) to (*e*) in which the predicted unwrapped data (shown in black) for a given topographical data set is overlaid, at its predicted location, onto the actual unwrapped phase map generated from the image obtained at the second perspective. Predicted unwrapped phase maps i) to iv) shown in FIGS. 14(*b*) to (*e*) correspond respectively to the topographical data sets i) to iv) shown in FIG. 13. As can be seen, the predicted location of the predicted unwrapped phase map ii) is actually coincident with the part of the second image that represents the middle-top surface 37. However, the predicted location of the other predicted phase maps i), iii) and iv) correspond to points in the unwrapped phase map obtained from the second image that do not wholly correspond to the middle-top surface. Furthermore, the predicted unwrapped phase map ii) will be the only one having a form that closely matches the unwrapped phase of the second image at that part of the second image. Accordingly, the data set ii) in FIG. 14(*b*) will provide the closest match out of all of the predicted data sets i) to iv).

At step 508, the topographical data set associated with the "predicted" unwrapped phase map having a form which most closely matched that of the second image's unwrapped phase map is then selected as being the topographical data that most accurately represents the actual topography of the region of the object. In the described example, this will be data set ii) of FIG. 13. As described above, this topographical data is output as a 3D point cloud. As will be understood, rather than merely selecting the data set that has already been generated, a fresh data set can be generated based on the absolute height information that has been derived by this process. The fresh data set could be generated from the first image, the second image, or indeed any other image of the object used in the process. Furthermore, the method at step 508 could optionally involve also calculating topographical data for the region from the second image (and/or any other images used in the process) and then averaging the topographical data obtained from both images together so as to obtain an averaged topographical data set, which could more accurately represent the actual topography of the region than the data obtained from just one of the images.

The embodiment described above uses an optical fringe pattern. However, this need not necessarily be the case. For instance, the optical pattern could comprise a set of lines or spots. In these cases, rather than creating phase maps from which the topographical data is obtained, the system could be calibrated such that the 3D position of the point on the object on which a particular line (or point) is projected can be calculated from the detected location of that line (or spot) within the image. However, especially for a repeating pattern of identical lines (or spots) which particular line (or spot) is imaged at at a given location may not be known. However since only a finite number of lines (or spots) are projected there are only a finite number of possible 3D positions of each point being considered. It is then possible to calculate a number of different possible topographies from the optical pattern as imaged in one of the images. The method could then involve for each of those topographies extrapolating the location and form of the pattern for the second image, comparing them to the optical pattern as imaged in the second image, and selecting the topography from which the optical pattern that gives rise to the best match was extrapolated.

In the method described above images from only two perspectives are obtained and used. However, it is possible that an ambiguous result might be obtained, for example if either the area being considered is small or if the area contains a step that has not been detected by the edge detection processing prior to phase unwrapping. If the area is small then the form of the predicted phase map may closely match more than one predicted area in the second image's unwrapped phase map. If the area contains an undetected step then the form of the predicted unwrapped phase maps will not closely match the form of any of the predicted areas in the second unwrapped phase map. In either case the ambiguity may be resolved by analysing images from one or more further perspectives in a similar manner. Accordingly, it is possible that step 104 of FIG. 5 is performed three or more times to obtain images of the object on which the optical pattern is projected from at least three perspectives, and that step 406 comprises repeating the method of FIG. 8 with each of the other images obtained in order to determine which is the data set to select.

The method described above using the calculation of all possible degenerate datasets is not necessarily the only way to calculate the topographical data best describing the object's surface. As an alternative to calculating all the degenerate datasets, known optimisation techniques could be used to calculate the topographical data from the multiple perspectives, starting from an arbitrarily chosen value of the $2\pi$ multiple for each perspective. The function to be minimised would be a measure of the difference in the topographical data generated from the different perspectives. The function could, for example, be an RMS distance between closest points originating between different perspectives, or it could be a measure of the distance and angle between surfaces fitted to the points from different perspectives, or any other suitable function relating to the distance in shape or in absolute phase for the regions under consideration from multiple perspectives. Such a function could be, in general, non-linear and discrete with multiple minima. Possible optimisation techniques include integer programming techniques such as branch and bound or cutting planes, non-linear optimisation algorithms, for example gradient descent, with multiple different start points and combined with branch and bound to take account of the discrete nature of the solution space, and metaheuristic or stochastic techniques such as simulated or quantum annealing. It is likely that such optimisation techniques would only become preferable to checking all the possible different 2π adjustment values as described in detail above if a large number of possible solutions are available—that is, if the probe's measurement volume is large, the fringe pitch is small, and/or a large number of perspectives are used, resulting in a large number of possible combinations of 2π adjustment values.

The invention claimed is:

1. A non-contact method of inspecting the topography of an area of an object via analysis of the phase of a pattern projected on the object, comprising:
   i) taking a first image of the object, obtained from a first perspective, on which an optical pattern is projected;
   ii) taking a second image of the object, obtained from a second perspective, on which an optical pattern is projected but in which the optical pattern, as it falls on the object, in the second image differs to that in the first image; and
   iii) determining data describing the topography of at least a region of the object based on phase data relating to the phase of at least a region of the optical pattern as imaged in the first image in which phase data obtained from a corresponding region of the object as imaged in the second image is used to resolve any ambiguity in the phase or topography data obtained from the first image, wherein the region of the optical pattern as imaged in the first image and the corresponding region of the object as imaged in the second image each comprise a plurality of mutually adjacent pixels that define areas extending substantially in two dimensions.

2. A method as claimed in claim 1, in which at least one of the relative position and relative orientation of the object and projector of the optical pattern at step i) is different to that of the object and projector of the optical pattern at step ii).

3. A method as claimed in claim 1, in which the projector of the optical pattern imaged at step i) and the projector of the optical pattern imaged at step ii) are provided by a common optical pattern projector unit comprising at least one projector, and in which the method further comprises relatively moving the object and the optical pattern projector unit between steps i) and ii).

4. A method as claimed in claim 3, comprising moving the optical pattern projector unit relative to the object.

5. A method as claimed in claim 3, in which the projector of the optical pattern imaged at step ii) is the projector of the optical pattern imaged at step i).

6. A method as claimed in claim 1, in which the optical pattern projected onto the object in step i) and step ii) is the same.

7. A method as claimed in claim 1, in which the first image and the at least second image are obtained by a common imager device comprising at least one image sensor, and in which the method comprises moving the imager device from the first perspective to the second perspective.

8. A method as claimed in claim 3, in which the optical pattern projector unit and the imager device are in a fixed spatial relationship relative to each other.

9. A method as claimed in claim 8, in which the optical pattern projector unit and the imager device are mounted on a coordinate positioning apparatus.

10. A method as claimed in claim 8, in which the optical pattern projector unit and the imager device unit are provided as a single probe.

11. A method as claimed in claim 1, comprising comparing data from the first image for the region to data derived from the second image for at least one region, to identify correlating regional data so as to resolve any ambiguity in the phase or topography data.

12. A method as claimed in claim 11, in which the method comprises iteratively comparing data derived from the first and second images to resolve any ambiguity in the phase or topography data by deduction.

13. A method as claimed in claim 1, in which step iii) comprises determining a plurality of different data sets relating to different possible topographies of at least a region of the object.

14. A method as claimed in claim 13, in which step iii) comprises identifying which data set most accurately represents the object based on data obtained from the second image so as to resolve any ambiguity in the phase or topography data.

15. A method as claimed in claim 13, comprising selecting a data set to use based on data obtained from the second image.

16. A method as claimed in claim 13, in which step iii) comprises determining which of the plurality of different data sets is most consistent with data obtained from the second image.

17. A method as claimed in claim 16, in which step iii) comprises determining which of the plurality of different data sets is most consistent with data relating to the region of the object obtained from the second image.

18. A method as claimed in claim 13, in which step iii) comprises based on the knowledge of the first and second perspectives, determining for at least some of the different data sets the part of the second image that corresponds to the region of the object for which the data sets have been obtained.

19. A method as claimed in claim 13, in which step iii) comprises determining which of the plurality of different data sets is most consistent with the form of the data obtained from the second image.

20. A method as claimed in claim 13, comprising:
    for at least some of the different data sets extrapolating therefrom data relating to the region of the object as it should be when obtained from the second perspective; and
    comparing the extrapolated data with data relating to the region of the object actually obtained from the second image.

21. A method as claimed in claim 20, in which the extrapolated data relates to the expected optical pattern as obtained from the second image.

22. A method as claimed in claim 20, in which the extrapolated and actual data relate to the distortion of the optical pattern.

23. A method as claimed in claim 20, in which the extrapolated and actual data relate to the phase of the optical pattern.

24. A method as claimed in claim 1, in which step iii) comprises:
    a) calculating at least one phase map from the first image; and
    b) from the at least one phase map calculating a plurality of different data sets relating to possible topographies for the at least the region of the object.

25. A method as claimed in claim 24, in which step i) comprises taking a plurality of first images obtained substantially from the same first perspective, and in which step a) comprises calculating the at least one phase map from the plurality of images.

26. A method as claimed in claim 24, in which step iii) further comprises:
- x) calculating a phase map from the second image;
- y) for at least some of the plurality of different data sets determined in step b) extrapolate therefrom corresponding phase map data for the second perspective; and
- z) identifying which calculated phase map data is most consistent with the form of a corresponding region of the second image's phase map.

27. A method as claimed in claim 26, in which step ii) comprises taking a plurality of second images obtained substantially from the same second perspective, and in which step x) comprises calculating the at least one phase map from the plurality of images.

28. An apparatus for non-contact inspection of an object, comprising:
- at least one projector configured to project an optical pattern onto the object to be inspected;
- at least one imager device configured to obtain a first and at least a second image of the object, from first and at least second perspectives, on which the optical pattern is projected; and
- an analyser configured to determine the topography of at least a region of the object based on phase data relating to the phase of at least a region of the optical pattern as imaged in the first image in which phase data obtained from a corresponding region of the object as imaged in the second image is used to resolve any ambiguity in the phase or topography data obtained from the first image, and in which the optical pattern, as it falls on the object, in the second image differs to that in the first image,
- wherein the region of the optical pattern as imaged in the first image and the corresponding region of the object as imaged in the second image each comprise a plurality of mutually adjacent pixels that define areas extending substantially in two dimensions.

29. An apparatus for non-contact inspection of an object, comprising:
- means for projecting an optical pattern onto the object to be inspected;
- means for obtaining a first and at least a second image of the object, from first and at least second perspectives, on which the optical pattern is projected; and
- means for determining the topography of at least a region of the object based on phase data relating to the phase of at least a region of the optical pattern as imaged in the first image in which phase data obtained from a corresponding region of the object as imaged in the second image is used to resolve any ambiguity in the phase or topography data obtained from the first image, and in which the optical pattern, as it falls on the object, in the second image differs to that in the first image,
- wherein the region of the optical pattern as imaged in the first image and the corresponding region of the object as imaged in the second image each comprise a plurality of mutually adjacent pixels that define areas extending substantially in two dimensions.

* * * * *